(12) United States Patent
Ernst et al.

(10) Patent No.: US 8,341,548 B2
(45) Date of Patent: Dec. 25, 2012

(54) IMAGE DISPLAY SYSTEM

(75) Inventors: Rudolf O. Ernst, Leesberg, VA (US); Rahul C. Thakkar, Sterling, VA (US)

(73) Assignee: Pixia Corp., Sterling, VA (US)

( * ) Notice: Subject to any disclaimer, the term of this patent is extended or adjusted under 35 U.S.C. 154(b) by 631 days.

(21) Appl. No.: 12/568,250

(22) Filed: Sep. 28, 2009

(65) Prior Publication Data

US 2010/0111411 A1    May 6, 2010

Related U.S. Application Data

(63) Continuation of application No. 11/123,146, filed on May 6, 2005, now Pat. No. 7,607,106, which is a continuation of application No. 10/263,930, filed on Oct. 3, 2002, now Pat. No. 6,912,695, which is a continuation-in-part of application No. 10/243,273, filed on Sep. 13, 2002.

(60) Provisional application No. 60/322,011, filed on Sep. 13, 2001.

(51) Int. Cl.
  *G06F 3/048* (2006.01)
  *G09G 5/00* (2006.01)
  *G06K 9/00* (2006.01)
(52) U.S. Cl. ........ 715/792; 715/764; 715/800; 345/530; 345/537; 345/538; 382/166; 382/284; 382/307
(58) Field of Classification Search .................. 715/792, 715/764, 800; 382/166, 284, 307; 345/55, 345/530–538
See application file for complete search history.

(56) References Cited

U.S. PATENT DOCUMENTS

| | | | |
|---|---|---|---|
| 4,823,108 A | 4/1989 | Pope | |
| 4,873,513 A | 10/1989 | Soults et al. | |
| 4,878,117 A | 10/1989 | Ikehira et al. | |
| 5,263,136 A | 11/1993 | DeAguiar et al. | |
| 5,341,466 A | 8/1994 | Perlin et al. | |
| 5,414,809 A | 5/1995 | Hogan et al. | |
| 5,513,282 A | 4/1996 | Williams | |

(Continued)

FOREIGN PATENT DOCUMENTS

JP   2000-148066 A   5/2000

(Continued)

OTHER PUBLICATIONS

Australian Office Action for Australian Patent Application No. 2007242940, mailed on Oct. 5, 2009.

(Continued)

*Primary Examiner* — Tadeese Hailu
(74) *Attorney, Agent, or Firm* — Pillsbury Winthrop Shaw Pittman LLP

(57) ABSTRACT

A method of configuring an image for data storage on a storage device in an overlapping-tiled format and a method of displaying a desired image selected for viewing on a display are disclosed. The method of configuring an image for data storage includes formatting an image to include a plurality of image tiles, each image tile in the plurality of image tiles having at least a portion that is substantially identical to at least a portion of an adjacent image tile in the plurality of image tiles. The method further includes converting data of the image from data in a first color space into data in a second color space so as to reduce a size of the data of the image, and storing the image data in the second color space.

12 Claims, 18 Drawing Sheets

U.S. PATENT DOCUMENTS

| | | | |
|---|---|---|---|
| 5,611,041 | A | 3/1997 | Bril et al. |
| 5,706,451 | A | 1/1998 | Lightbody et al. |
| 5,710,835 | A | 1/1998 | Bradley |
| 5,819,278 | A | 10/1998 | Hamburg |
| 5,831,612 | A | 11/1998 | Stoval, III et al. |
| 5,847,705 | A | 12/1998 | Pope |
| RE36,145 | E | 3/1999 | DeAguiar et al. |
| 5,889,669 | A | 3/1999 | Kagami et al. |
| 5,905,506 | A | 5/1999 | Hamburg |
| 5,933,537 | A | 8/1999 | Hajjahmad et al. |
| 6,012,109 | A | 1/2000 | Schultz |
| 6,075,905 | A | 6/2000 | Herman et al. |
| 6,091,430 | A | 7/2000 | Bodin et al. |
| 6,130,661 | A | 10/2000 | Ilbery |
| 6,141,023 | A | 10/2000 | Meinerth et al. |
| 6,182,127 | B1 | 1/2001 | Cronin, III et al. |
| 6,192,393 | B1 | 2/2001 | Tarantino et al. |
| 6,222,562 | B1 | 4/2001 | Leidich |
| 6,262,741 | B1 | 7/2001 | Davies |
| 6,278,432 | B1 | 8/2001 | Ratnakar |
| 6,323,854 | B1 | 11/2001 | Knox et al. |
| 6,377,306 | B1 | 4/2002 | Johnson et al. |
| 6,400,763 | B1 | 6/2002 | Wee |
| 6,493,858 | B2 | 12/2002 | Solomon |
| 6,549,681 | B1 | 4/2003 | Takiguchi et al. |
| 6,674,881 | B2 | 1/2004 | Bacus et al. |
| 6,711,283 | B1 | 3/2004 | Soenksen |
| 6,714,205 | B1 | 3/2004 | Miyashita et al. |
| 6,721,952 | B1 | 4/2004 | Guedalia et al. |
| 6,904,176 | B1 | 6/2005 | Chui et al. |
| 6,912,253 | B1 | 6/2005 | Li et al. |
| 6,912,695 | B2 | 6/2005 | Ernst et al. |
| 7,080,131 | B2 | 7/2006 | Palevich et al. |
| 7,085,435 | B2 | 8/2006 | Takiguchi et al. |
| 7,119,811 | B2 | 10/2006 | Ernst et al. |
| 7,366,360 | B2 | 4/2008 | Takiguchi et al. |
| 7,607,106 | B2 | 10/2009 | Ernst et al. |
| 2002/0004860 | A1 | 1/2002 | Roman |
| 2002/0021758 | A1* | 2/2002 | Chui ............... 375/240.19 |
| 2002/0093516 | A1 | 7/2002 | Brunner et al. |
| 2002/0159632 | A1 | 10/2002 | Chui et al. |
| 2002/0194302 | A1 | 12/2002 | Blumberg |
| 2002/0196467 | A1 | 12/2002 | Delhoune et al. |
| 2003/0031258 | A1* | 2/2003 | Wang et al. ............. 375/240.24 |
| 2003/0034936 | A1 | 2/2003 | Ernst et al. |
| 2003/0063127 | A1 | 4/2003 | Ernst et al. |
| 2003/0067420 | A1 | 4/2003 | Ernst et al. |
| 2006/0210196 | A1 | 9/2006 | Wensley et al. |
| 2007/0124793 | A1 | 5/2007 | Wang et al. |

FOREIGN PATENT DOCUMENTS

| | | | |
|---|---|---|---|
| WO | | 00/68887 A1 | 11/2000 |

OTHER PUBLICATIONS

Canadian Office Action issued regarding Canadian Patent Application No. 2,406,675, mailed Jul. 30, 2010.
Canadian Office Action issued regarding Canadian Patent Application No. 2,463,671, mailed Jul. 8, 2010.
Chinese Office Action for Chinese Patent Application No. 038244276, mailed on Oct. 26, 2007.
Chinese Office Action for Chinese Patent Application No. 038244276, mailed on Aug. 8, 2008.
Chinese Office Action for Chinese Patent Application No. 038244276, mailed on Feb. 6, 2009.
European Office Action for European Patent Application No. 02759681.6, mailed on Sep. 22, 2008.
Supplemental European Search Report for European Patent Application No. 02759681.6, mailed on Jun. 27, 2008.
European Office Action for European Patent Application No. 03799307.8, mailed on Jan. 23, 2009.
Supplemental European Search Report for European Patent Application No. 03799307.8, mailed on Jun. 27, 2008.
Israeli Office Action for Israeli Patent Application No. 167711, mailed on Jan. 25, 2009.
Israeli Office Action for Israeli Patent Application No. 167711, mailed on Oct. 11, 2009.
Israeli Office Action for Israeli Patent Application No. 167711, mailed on Jun. 24, 2010.
Japanese Office Action for Japanese Patent Application No. 2004-541816, mailed on Feb. 2, 2010.
International Preliminary Examination Report for PCT International Patent Application No. PCT/US02/29210, mailed on May 24, 2004.
International Search Report for PCT International Patent Application No. PCT/US02/29210, mailed on Dec. 17, 2002.
International Preliminary Examination Report for PCT International Patent Application No. PCT/US03/30639, mailed on Dec. 3, 2004.
International Search Report for PCT International Patent Application No. PCT/US03/30639, mailed on Apr. 21, 2004.
Philippines Office Action for Philippines Patent Application No. 1-2005-500632, mailed on Feb. 19, 2009.
Barclay et al., Microsoft TerraServer: A Spatial Data Warehouse, The Institution of Electrical Engineers Stevenage, Jun. 2000, Great Britain; and 2000 ACM Sigmod. International Conference on Management of Data, May 16-18, 2000, Dallas, Texas, vol. 29, No. 2, Jun. 1, 2000, pp. 307-318, retrieved from url: <ftp://ftp.research.microsoft.com/pub/tr/tr-99-29.pdf>.
Bhatia et al., Design and Performance Analysis of a Distributed Image Space Navigator, Internet citation Aug. 1, 1997, Washington University Sever Institute of Technology, Department of Computer Science.
Yu et al., Processing Satellite Images on Tertiary Storage: A Study of the Impact of the Tile Size on Performance, NASA Conference on Mass Storage Systems, Sep. 1, 1996, College Park, Maryland, retrieved from url: <http://ntrs.nasa.gov/archive/nasa/casi.ntrs.nasa.gov/19960052752_1996083214.pdf>.
Information Technology—Generic Coding of Moving Pictures and Associated Audio Information: Systems, International Standard, ISO/IEC 13818-1, Second Edition, Dec. 1, 2000.
Japanese Decision of Rejection for Japanese Patent Application No. 2004-541816, mailed on Nov. 24, 2010.
Japanese Official Letter of Inquiry and Pre-Appeal Examination Report for Japanese Patent Application No. 2004-541816, mailed on Sep. 13, 2011.
Canadian Office Action for Canadian Patent Application No. 2,463,671, mailed Aug. 15, 2011.

* cited by examiner

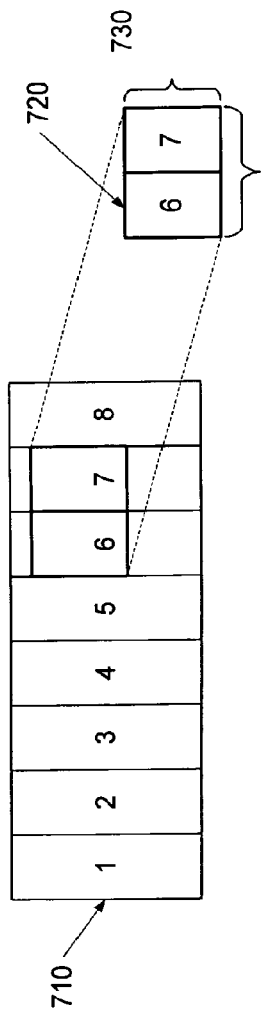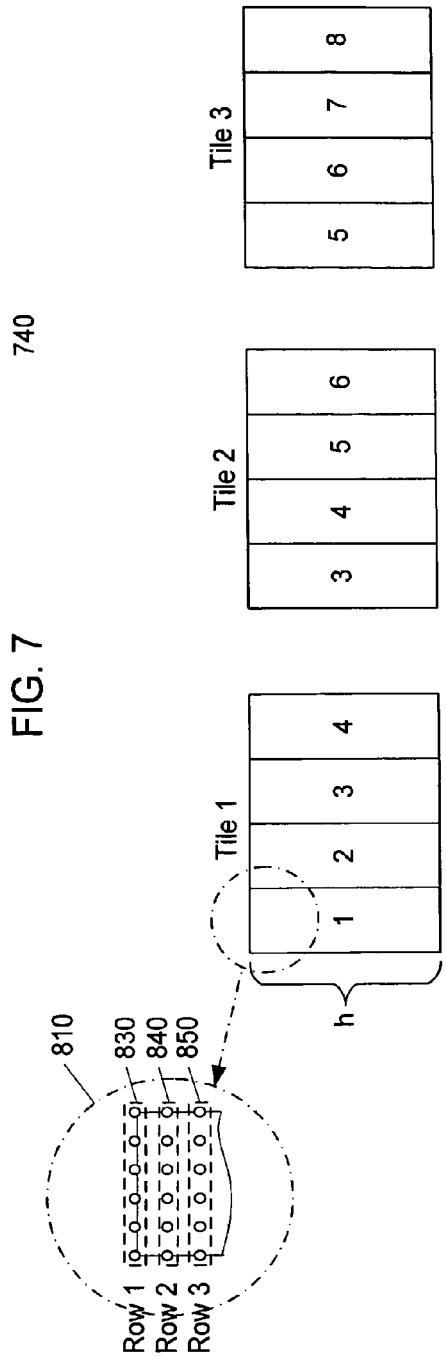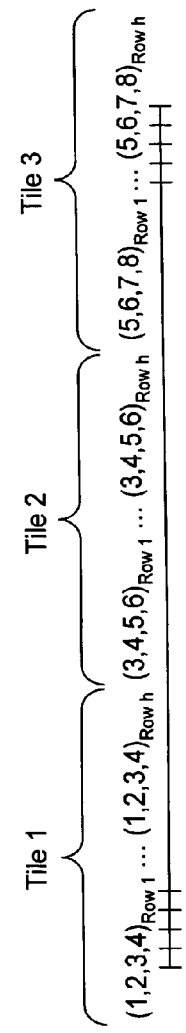
FIG. 7
FIG. 8
FIG. 9

IMAGE DISPLAY SYSTEM

RELATED APPLICATIONS

This application is a continuation of U.S. patent application Ser. No. 11/123,146, filed on May 6, 2005 now U.S. Pat. No. 7,607,106, which is a continuation of U.S. patent application Ser. No. 10/263,930, filed on Oct. 3, 2002 now U.S. Pat. No. 6,912,695, which is a continuation-in-part application of U.S. patent application Ser. No. 10/243,273, filed Sep. 13, 2002, which claims the benefit of U.S. Provisional Application No. 60/322,011, filed on Sep. 13, 2001. The contents of such applications are incorporated by reference herein.

BACKGROUND OF THE INVENTION

High-resolution digital imagery systems have only recently been made available to the general public. Presently, adequate display systems are very expensive and contain much more technology than is necessary for viewing large images in real time. Examples of such systems are Silicone Graphics, Inc.'s Onyx® family of computing systems (Mountain View, Calif.).

Less elaborate systems that are capable of loading/reading an image over two gigabytes in size will pass the image contained on the disk drive through a 3D graphics engine before displaying it. Due to the current speed limitations of these 3D graphics engines, the quality of the image displayed on the screen is poor. Such systems read the image from the hard drive as a bmp, rgb, or tif file.

Patented systems and methods that attempt to improve the management and display of images are described herein below. The contents of these disclosures are incorporated by reference herein.

A System for Managing Tiled Images Using Multiple Resolutions is disclosed in U.S. Pat. No. Re. 36,145. The system defines an address space for a virtual memory that includes an image data cache and a disk. An image stack for each source image is stored as a full resolution image and a set of lower-resolution subimages. Each tile of an image may exist in one or more of five different states as follows: uncompressed and resident in the image data cache, compressed and resident in the image data cache, uncompressed and resident on disk, compressed and resident on disk, and not loaded but recreatable using data from higher-resolution image tiles.

A Method for Storage and Retrieval of Large Digital Images is disclosed in U.S. Pat. No. 5,710,835. Image compression and viewing are implemented with (1) a method for performing DWT-based compression on a large digital image with a computer system possessing a two-level system of memory and (2) a method for selectively viewing areas of the image from its compressed representation at multiple resolutions and, if desired, in a client-server environment.

A method enabling a Fast Processed Screen Image is disclosed in U.S. Pat. No. 6,222,562. The method includes a display process for displaying predetermined image data in a computer that includes a processor, a fast memory, and a video system having a video memory. The method includes the steps of writing contents from a block of the fast memory to a first memory during a computer execution period, the fast memory having an access time that is less than an access time for the video memory; writing predetermined image data into the block of the fast memory; processing the predetermined image data from the fast memory; and writing the processed predetermined image data to the video memory.

A Method and System for Panorama Viewing is disclosed in U.S. Pat. No. 6,192,393. The method includes storing an image in tiled form on a server, receiving at a server from a client a request for at least a portion of the image, transmitting from the server to the client at least one tile corresponding to the at least a portion of the image requested by the client, and carrying out an individual tile-wise perspective correction on said at least one tile.

There are presently few systems that are adequate for managing and viewing large images. Those that are available (e.g., those by Silicone Graphics, Inc.) have a number of disadvantages including their high cost, high energy consumption, and large size and mass. There is clearly a need in the art for a system that can manage and display large images that overcomes these deficiencies.

SUMMARY OF THE INVENTION

The present invention enables users to quickly and seamlessly navigate large images in real time. More particularly, the present invention relates to navigating displayed images by enlarging or reducing (e.g., zooming in or out) and multi-dimensional roaming (e.g., panning) such displayed images at various levels of zoomed sizing. The images can be geographic (terrestrial and astronomy), chemical and biological compound and organism structures, anatomical structures of plants and animals, graphical representations of complex data and combinations (e.g., data on demographic and resource distribution over a geographical area). Such images tend to be massive in size, but require fast navigation and a high degree of resolution to be useful.

The invention enables a user to pan and zoom very large images with no perceptible image degradation. Images are stored in a tiled file format, or the like, to reduce disk access time. The most significant delay when reading a file in conventional systems occurs whenever the disk drive needs to seek to a new location. The tiled file format of the invention ensures that a single unit of image data is all that is required at any given point in time. This ensures that the disk drive needs to perform one seek to the beginning of the tile followed by reading the entire tile. If the image were not tiled, the disk drive would have to seek to the beginning of the first horizontal line, read the line, seek to the beginning of the next line, and continue doing this until all required lines are read.

In order to further reduce the disk access time, a storage device such as a disk drive is formatted so that the tile size is an integer multiple of the block size. In an embodiment of the invention described below, the block size on the disk drive is set to 640 (instead of 512) and the tile size is set to a width of 1280. This ensures that the data is perfectly aligned with the block boundaries on the disk drive. In other words, there are no extra bits read from the hard drive at any time. In prior art systems data is read from the disk drive in block chunks and the useless or extra data would be discarded.

An additional feature of the invention is the ability to zoom in and out of images very quickly. Instead of calculating the various zoom levels on the fly from the massive original file, the zoom levels are calculated offline and stored on the disk drive. The invention allows for images to be transformed to their file format relatively easily. This approach ensures that the worst-case scenario at any given point in time is that a single tile needs to be read from the disk drive.

An embodiment of the invention includes a method for showing an image on a display including the steps of generating a first tile and a second tile from an image, wherein the first tile and the second tile each have overlapping portions that overlap by at least an amount about equal to what can be shown on a display; storing the first tile and the second tile in memory; receiving a first instruction from an interface device to show on the display a first display image located within the first tile; determining that the first display image is located within the first tile; and transmitting the first display image from the first tile to the display for viewing.

Another embodiment of the invention includes a method for storing an image including the steps of reading image data defining an image from one or more files; generating two or more tiles from the image data, wherein (i) each tile includes two or more tile sections, (ii) one or more of the tile sections in each tile is virtually identical to the one or more overlapping tile sections in an adjacent tile, and (iii) the height of each tile section is greater than or about equal to the height of a display on which the two or more tiles are to be shown; and storing the two or more tiles.

Another embodiment of the invention includes a method for storing an image including the steps of providing an image formatted to include two or more tiles, wherein each tile has an overlapping portion that overlaps an adjacent tile by at least an amount about equal to what can be shown on a display, and each tile is defined by rows of pixels; storing each row of pixels of a tile sequentially starting at a first corner of a tile and ending on the diagonally opposing corner of the tile; and skipping to a first corner of an adjacent overlapping tile and repeating storing step until all of the tiles have been stored.

Another embodiment of the invention includes a method for reading image data from a disk drive including the steps of instructing a controller to read image data from a disk drive, wherein the image data is stored on the disk drive as a contiguous stream of data, by (i) moving a head of the disk drive so the that the head is located at the beginning of the image data, and (ii) reading all of the image data from beginning to end; and transmitting the image data for viewing on a display.

Another embodiment of the invention includes a method for reading image data from a disk drive including the steps of seeking to a contiguous stream of image data on a disk drive; reading the image data from beginning to end; and transmitting the image data for viewing on a display.

Another embodiment of the invention includes a method for showing a scaled image on a display including the steps of storing an image on a storage device; receiving an instruction to generate and store multiple scaled levels of the image; scaling the image in accordance with the instruction; and storing the scaled levels on the storage device.

Another embodiment of the invention includes a method for displaying multiple synchronized images including the steps of providing two or more viewing systems interconnected so a first viewing system operates as a master to the remaining two or more viewing systems; providing a display for each viewing system; showing an image on each display, wherein each image is contiguous with the image on an adjacent display; and panning the contiguous images shown on each display, wherein the edges of adjacent images are synchronized more than 30 times per second.

Other features of the invention will become apparent from the following detailed description of embodiments thereof, taken in conjunction with the accompanying drawings.

BRIEF DESCRIPTION OF THE DRAWINGS

So that those having ordinary skill in the art to which the disclosed system and method appertains will more readily understand how to make and use the invention, reference may be made to the drawings wherein:

FIG. 7 illustrates an image that is to be transformed into tiles having horizontal overlap with adjacent tiles;

FIG. 8 illustrates tiles having horizontal overlap generated from the image illustrated in FIG. 7;

FIG. 9 illustrates a method of storing the tiles illustrated in FIG. 8;

DETAILED DESCRIPTION OF PREFERRED EMBODIMENTS

Figure 1:
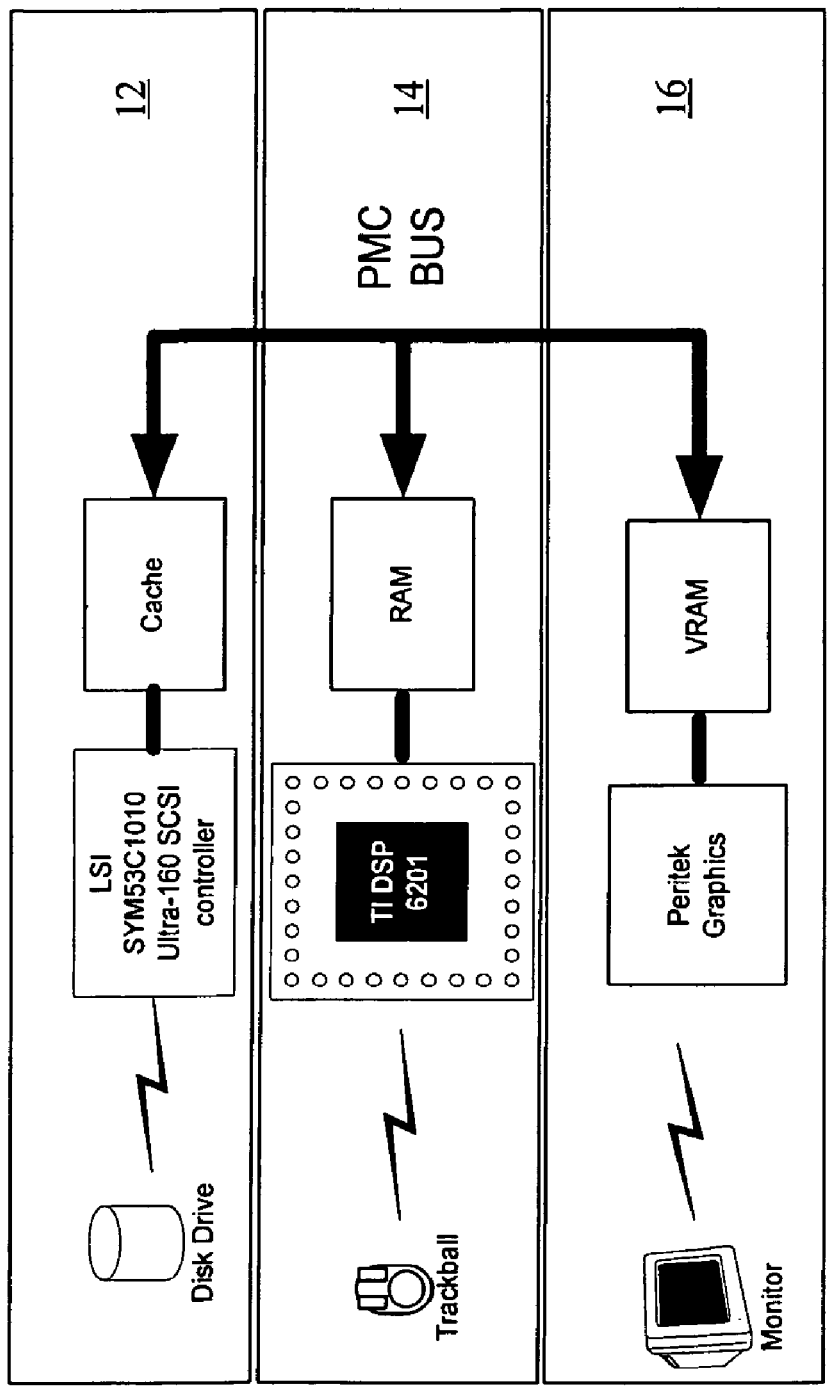
FIG. 1 is a functional hardware diagram of an embodiment of the invention.

An image display system is disclosed that enables users to navigate very large images quickly and seamlessly. The system is optimized to transmit image data from a disk drive to VRAM at high data rates. The image data is stored on the disk drive in a file format optimized for high speed retrieval, display, and seamless navigation. The image display system can be cascaded for showing two or more contiguous images on a single or on multiple displays.

Definitions

The term "display" means a computer output surface or projecting mechanism that shows text and graphic images to a computer user, using a cathode ray tube ("CRT"), liquid crystal display ("LCD"), light-emitting diode, gas plasma, or other image projection technology.

The term "pan," "panning," or the like means for a system user to traverse an image on a display in the horizontal and/or vertical direction (2-D roaming) using an interface device.

The term "pixel" means a physical picture element shown on a display or the image data representing a picture element. Those of ordinary skill in the art will appreciate the various uses of the term. The context in which the term is used should indicate its particular meaning When the term pixel is used to refer to image data stored on a disk the term is referring to, for example, a single byte of image data for generating a pixel in black-and-white color space on a display, two bytes of image data for generating a pixel in YUV color space on a display, and three bytes of image data for generating a pixel in RGB color space on a display.

The term "block" means a group of bytes handled, stored and accessed as a logical data unit such as an individual file record. Typically, one block of data is stored as one physical sector of data on a disc drive.

DETAILED DESCRIPTION

The system is implemented in hardware embodiments and software-specific solutions or combinations thereof. It is possible to execute the algorithms of software embodiments on hardware embodiments of the present invention or on other hardware platforms which support, for example, Unix and Windows NT systems. For optimal performance, the software may be run on dedicated hardware of the classes outlined in this disclosure. Those skilled in the art will appreciate that the hardware equipment is not limited to particular models of components and sub-assemblies used in the examples presented herein.

Due to the lack of control in current operating systems, such as Windows NT or Unix, of the low level hardware registers, it is difficult to communicate with the controller effectively. Additionally, the operating system will tie up the PCI bus unpredictably. The present invention substantially avoids use of an operating system in the pathway of data traffic. The invention can provide one or more choices of dedicated algorithm to be loaded from FLASH to RAM and then executed. There is no traffic on a PCI bus unless initiated per the invention for its specific purposes. The invention also enables communication with the SCSI controller so that the SCSI controller can "push" image pixels from disk to VRAM on a SCSI board or the like, without using the processor. An operating system can be used for peripheral or collateral functions or minimally in the data traffic pathway.

Referring to FIG. 1, a hardware embodiment of the invention utilizes three PMC boards connected together via a PMC (or mini PCI) bus. The respective boards carry: a SCSI Controller and a hard drive 12; DSP processor and an interface device 14; and video components including VGA graphics engine and buffer memory 16. Exemplary components are described herein below.

Figure 2:
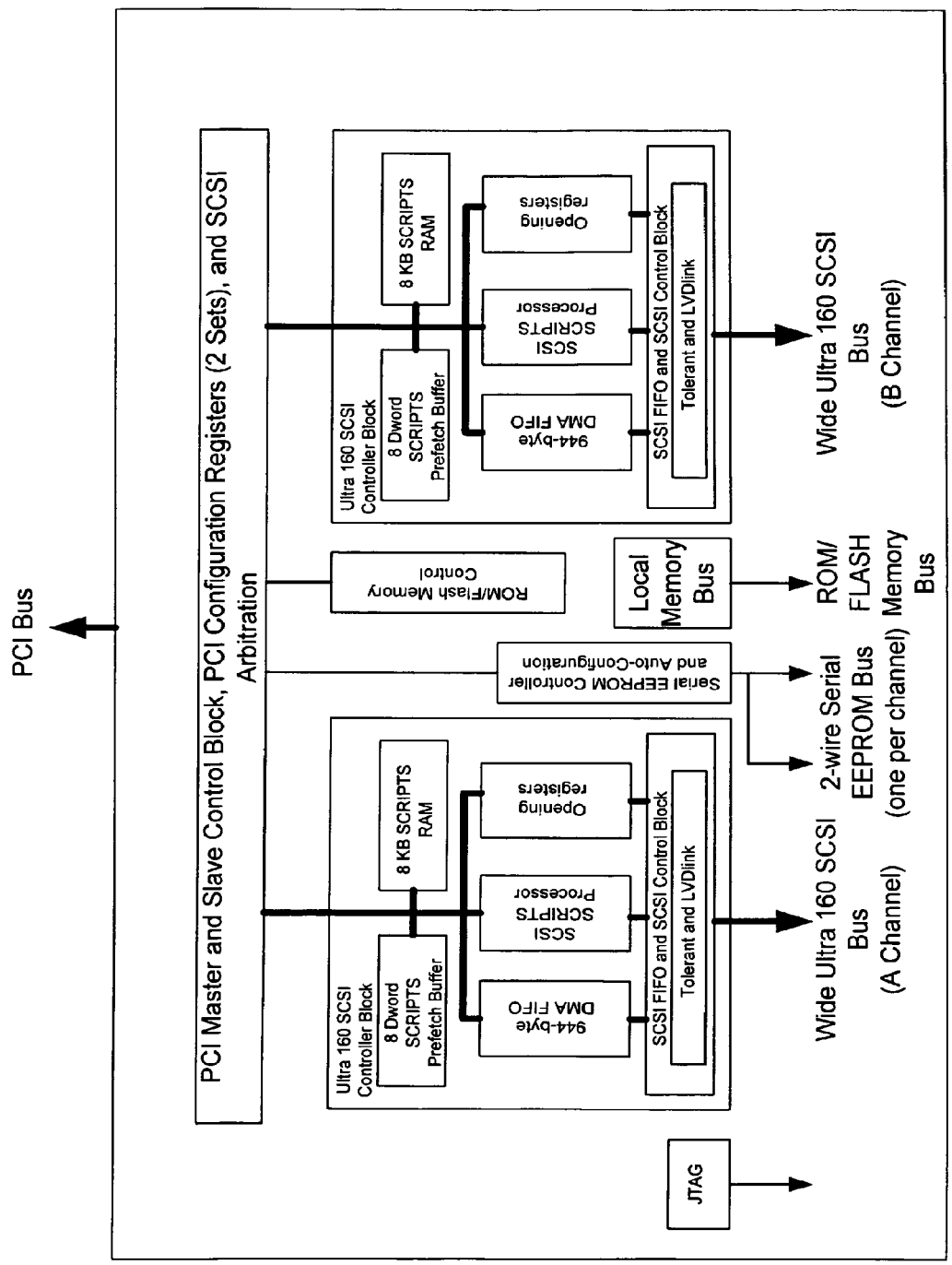
FIG. 2 is a SCSI block diagram per the FIG. 1 embodiment.

Referring to FIG. 2, a block diagram illustrates a SCSI controller board based on the VMIPMC-5790 manufactured by VMIC that may be used in the practice of the invention. This controller board utilizes LSI Logic's SYM53C1010 dual-channel ultra 160 SCSI controller. The SYM53C1010 controller has two independent ultra 160 SCSI controllers, support for SCSI, Ultra SCSI, Ultra2 SCSI, and Ultra160 SCSI, 8 KB of internal RAM per channel for SCRIPTS™, support for Nextreme RAID and for up to 32 disk drives (16 devices per controller). The system has been tested with an 18 GB ST318451LW Seagate drive as well as a 72 GB ST173404LW Seagate drive. The performance numbers are shown in Table 1 below. These speeds indicate how fast data can move from the disk drive to the VRAM.

TABLE 1

| Direct I/O Performance | | |
|---|---|---|
| | ST318451LW (18 GB) | ST173404LW (72 GB) |
| Read Speed | 40 MB/sec | 34 MB/sec |
| Write Speed | 32 MB/sec | 22 MB/sec |

Figure 3:
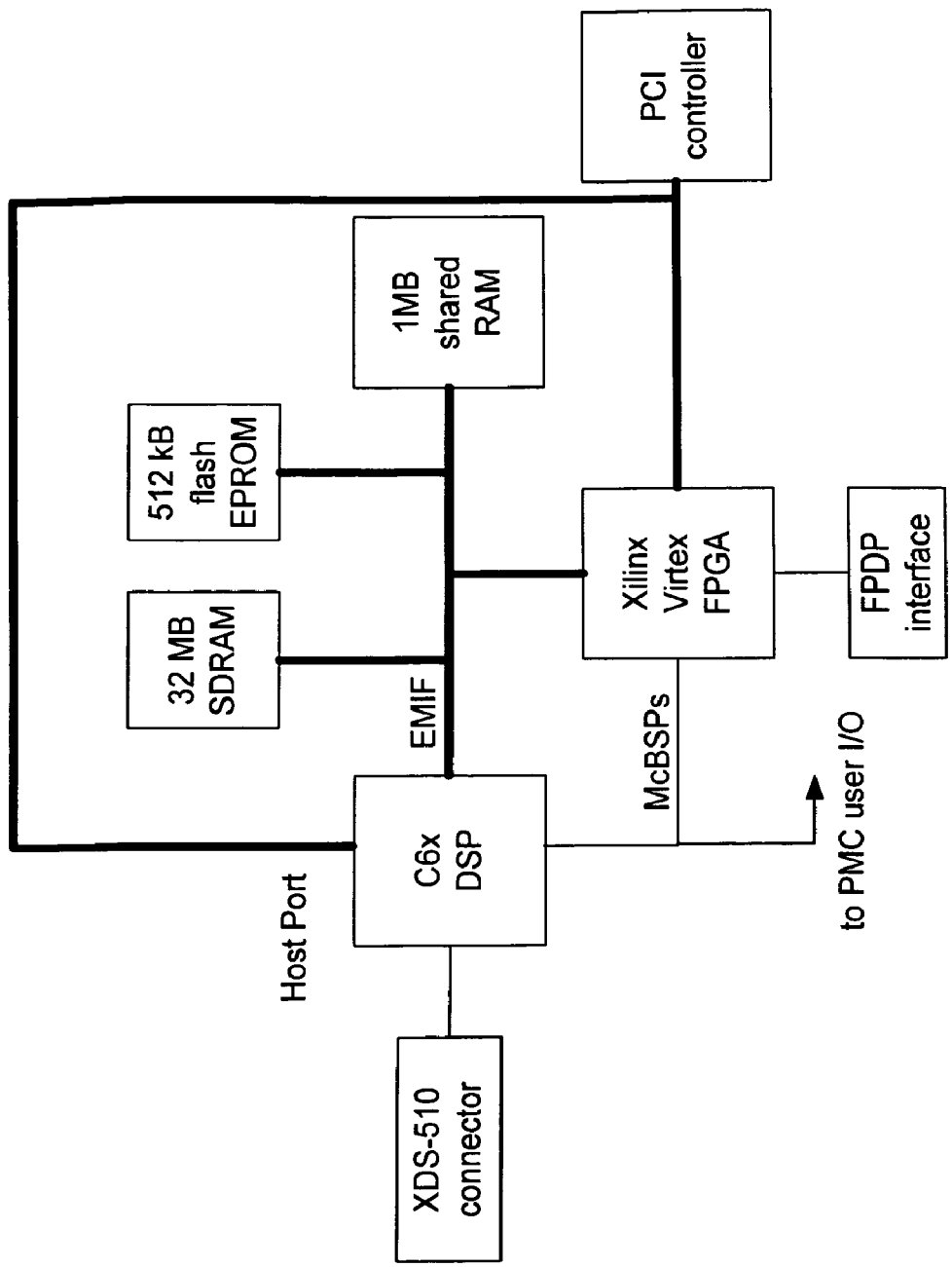
FIG. 3 is a DM11 block diagram per the FIG. 1 embodiment.

Referring to FIG. 3, a DSP processor that may be used in practice of the invention is a Texas Instruments' TMS320C6201 digital signal processor chip (6201 DSP), as integrated on a PMC board by Transtech DSP Corp. on its DM11 product. The board has a 6201 DSP running at 200 megahertz; 32 megabytes SDRAM; Xilinx Virtex FPGA; and FPDP Digital I/O. To make data accessible to the 6201 DSP processor, the data is read into shared memory. The performance numbers for moving image pixels from disk to shared memory on the DM11 PMC board are shown in Table 2 below. The bandwidth is limited by the bandwidth of the shared memory.

TABLE 2

| I/O via 6201 DSP | | |
|---|---|---|
| | ST318451LW (18 GB) | ST173404LW (72 GB) |
| Read Speed | 15 MB/sec | 15 MB/sec |
| Write Speed | 10 MB/sec | 10 MB/sec |

The system of the invention can be run on other processors such as a Power PC chip running Linux. An advantage of running on a Linux system is the ability to add new features quickly by using standard Linux device drivers for any new devices such as a color printer, or a modem. A disadvantage of running on a Linux system is the system may be hampered in terms of performance.

To increase the performance from shared memory to a video board, the Xilinx FPGA on the DM11 may be utilized. Performance values are shown in Table 3 below.

TABLE 3

| I/O via FPGA | | |
|---|---|---|
| | ST318451LW (18 GB) | ST173404LW (72 GB) |
| Read Speed | 25 MB/sec | 24 MB/sec |
| Write Speed | 18 MB/sec | 16 MB/sec |

A user may pan and/or zoom an image using an interface device such as a trackball, mouse, joystick or other interface device attached to a PS/2 port. To read the PS/2 stream, the McBSP (i.e., Multichannel Buffered Serial Port) is used on the c6201 DSP chip.

Figure 4:
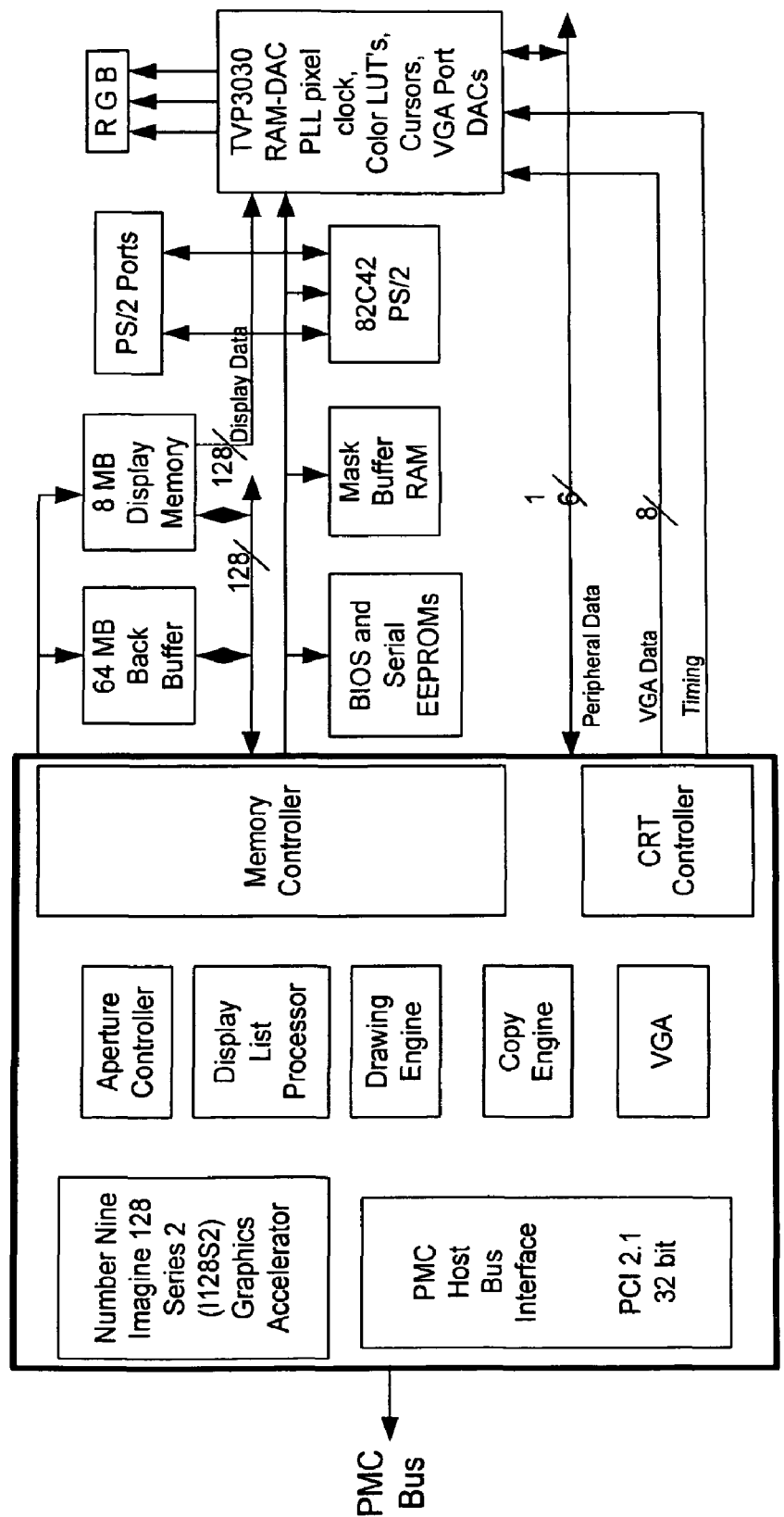
FIG. 4 is a VFX-M block diagram per the FIG. 1 embodiment.

Referring to FIG. 4, a preferred form of the graphics board uses the Peritek VFX-M/L PMC board. The graphics engine on this board is the Number Nine I128 2D/3D graphics engine. The video board contains two 4 MB SGRAM memory banks It affords two independently programmable memory windows; support for 8, 16, and 32 bits per pixel;

YUV-RGB color space conversion; and high speed image copy. YUV color space conversion works in real time on this graphics board. Since YUV 422 pixels only require 16 bits per pixel (instead of 24 bits), users can get a performance improvement of over 30 percent.

The invention may also implements a 2-D zooming algorithm on the video board. Essentially, a frame is copied from the off-screen buffer to the on-screen buffer every vertical interval. Instead of just copying the image, the image is scaled as it is copied. This allows the programmer to program a zoom-in or zoom-out of a specific image in the off-screen buffer.

The video board is also constructed so that the vertical interrupt signal goes directly to one of the IRQ pins on the 6201 DSP via a wire. This enables synchronization (synching) of all system operations with the vertical refresh of the output.

Figure 5:
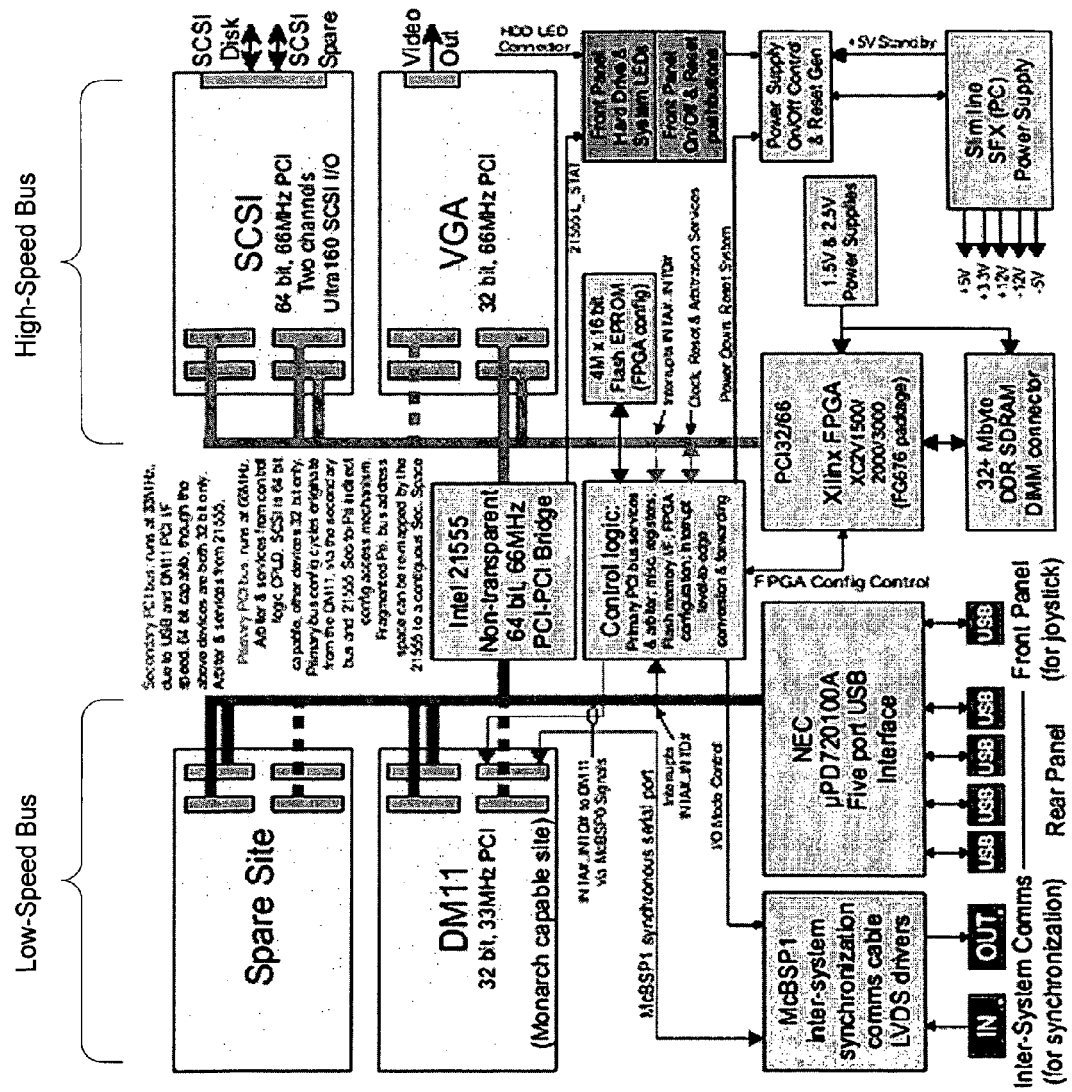
FIG. 5 is a block diagram illustrating an embodiment of the present invention.
Figure 6:
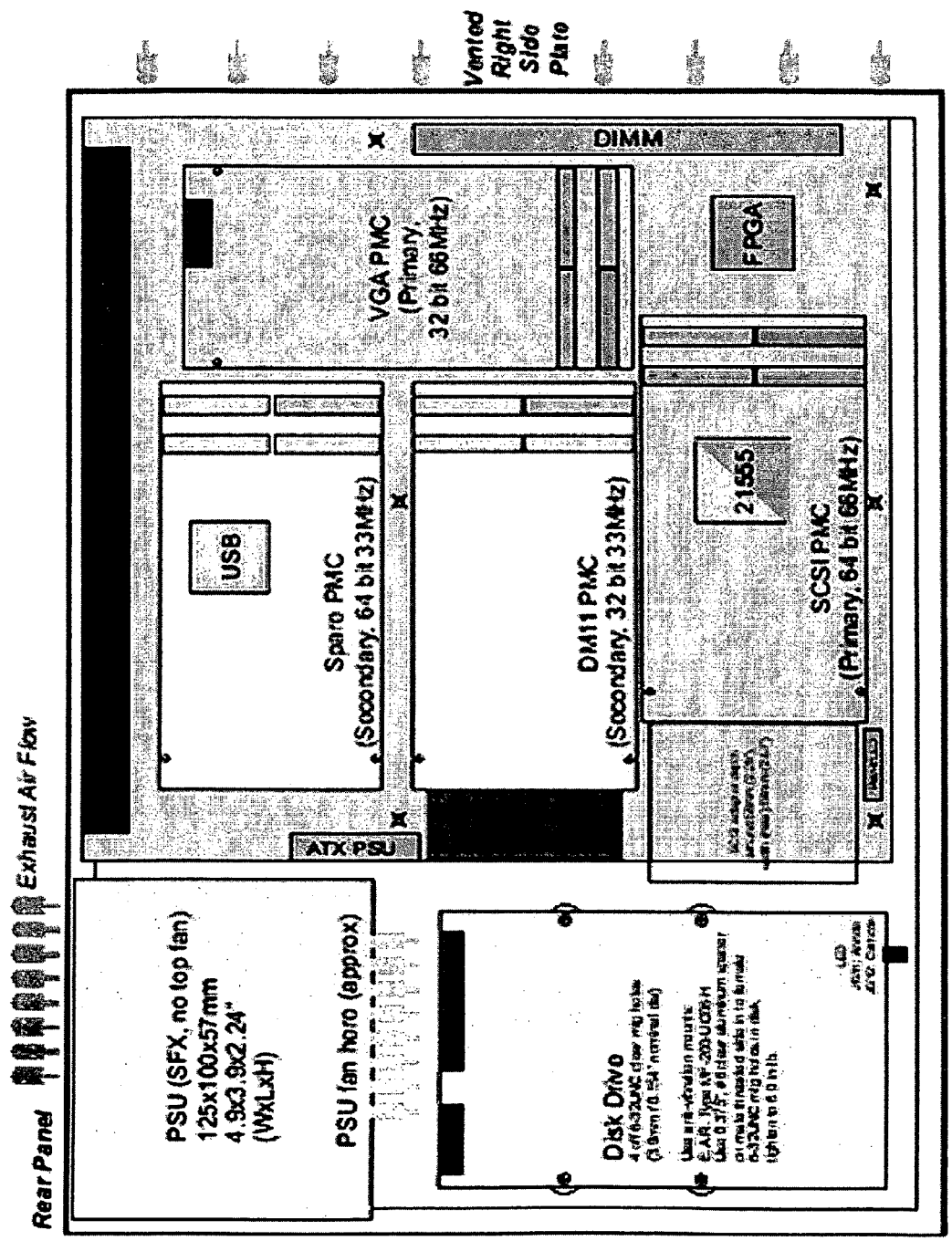
FIG. 6 is a plan view of the embodiment of the invention illustrated FIG. 5 as assembled in an transportable enclosure.

Referring to FIGS. 5 and 6, another hardware embodiment is illustrated. An advantage of the embodiment includes use of USB ports for providing improved communication with the system such as for acquiring debugging messages. A further advantage is the use of a more sophisticated FPGA allowing for real-time manipulation of data. For example, image data can be stored compressed on the disk drive and then decompressed in real time using the FPGA when the data is needed for viewing.

The software embodiment of the present invention has been optimized to run on dedicated hardware such as that described herein. The software will also run on other systems as well. That is, libraries of the software can be compiled so they can be executed on hardware as described above, in a computer with I/O (such as a display for printing messages), in a computer from FLASH (no I/O), on a stand-alone basis (no I/O) and in operating systems including but not limited to Windows NT, Unix, Linux, Windows 2000 or Windows CE. The software may be categorized as low-level software (for accessing the registers of the various chips) and high-level software (for using the low-level functions to build a working system).

According to the invention large images are converted to a preferred file format so the images can be read very efficiently. Besides the header, the files generated from the file format contain the original image along with its various scaled zoom levels. Development of such files is described in more detail herein below.

The filing system does not have a two Gigabyte file size limitation. The file limit may be expanded to $2^{40}$ bytes, or approximately 1 terabyte, or greater, to ensure high speed/high resolution performance.

Various source image files may be read using the preferred file format (e.g., bmp, tiff, jpg). If an image file is less than 2 gigabytes then a file generated from the file format can be created directly from that image. If an image file is larger than 2 gigabytes, then the image file must first be tiled into tiles that are less than 2 gigabytes each. These tiles can then be converted to a preferred file, which can be of any size. For example a bmp file over 2 gigabytes can first be converted to a bim file. Thereafter, a file generated from the preferred file format can be generated.

Movie files may be created from a sequence of bmp files or from sequences of other formats such as avi or jpg sequences. When the movie files are played back later, the in and out frame as well as the frame rate can be set.

An MAFR file can be created from the preferred file format and movie files. The MAFR file links the various images on the hard disk together. It is in the MAFR file where different images are related to each other spatially. In order to relate images to one another one coordinate system is chosen. For example, if the highest resolution image to be set to a scale factor of 1 is chosen, all of the lower resolution images are scaled according to their scale factor. For example, a 5 megabyte resolution image has a scale factor of 5 if the highest resolution image is 1 megabyte. To add an image to the existing database the image would be linked to a specific level of an existing image in the database. Once the image has been linked, its exact coordinates within the other image must be specified.

Movie files can also be linked to specific levels of an image. It is contemplated that the linking is to be defined to a specific window within a level. This allows for numerous videos for the same level.

Figure 21:
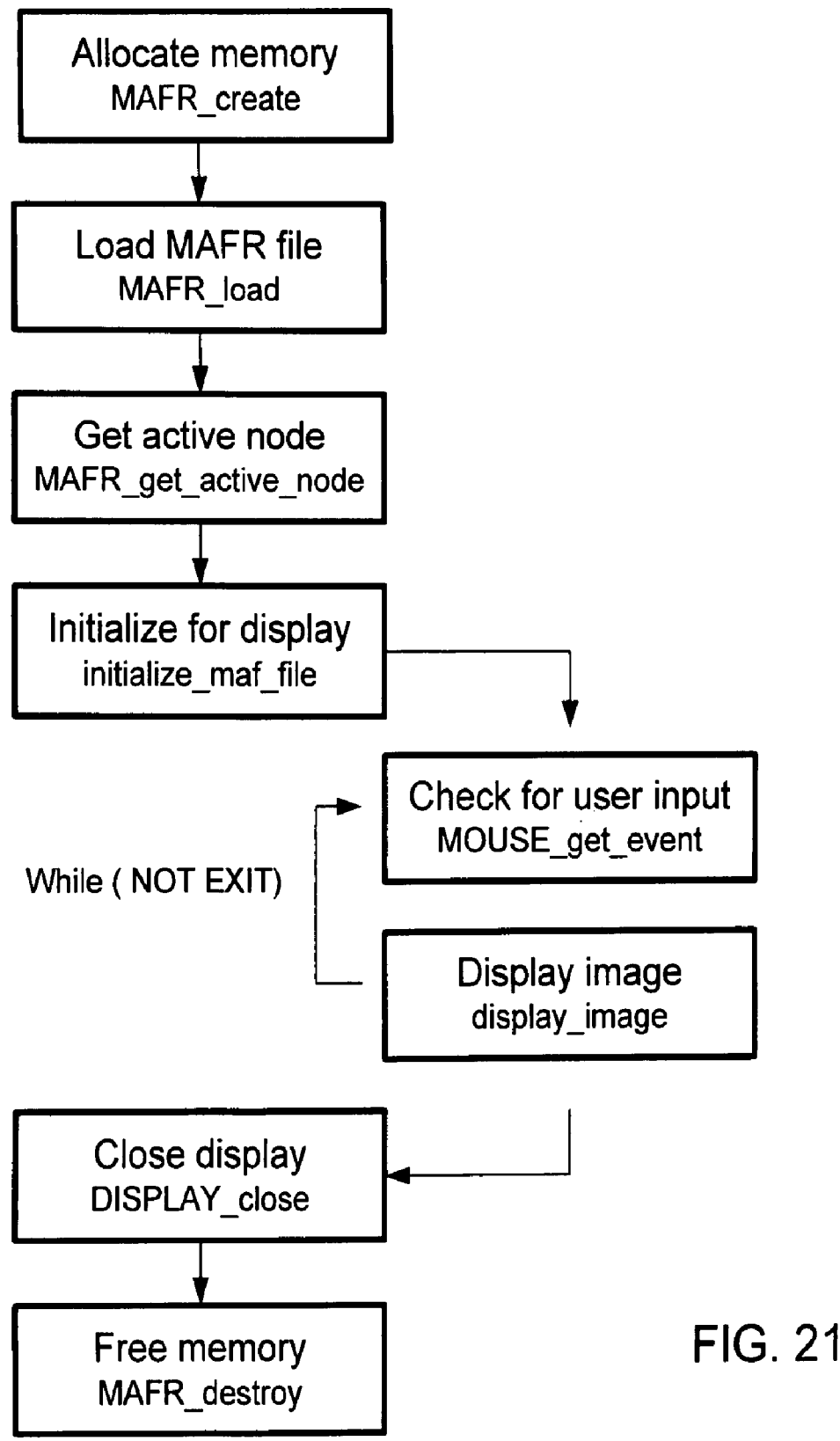
FIG. 21 is a block diagram of a main loop in a display program for an embodiment of the present invention.
Figure 22:
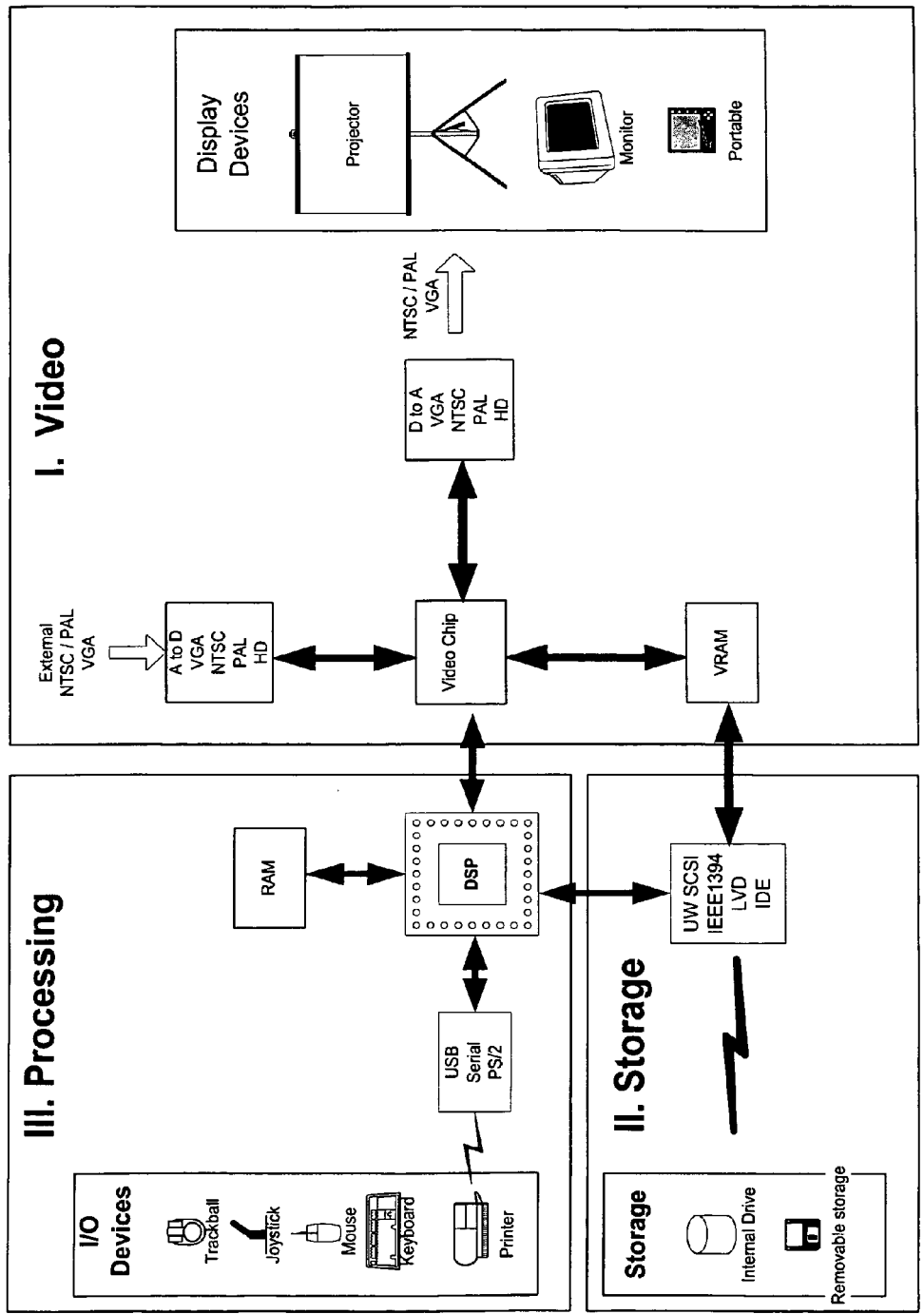
FIG. 22 is a block diagram of display-image functions per the FIG. 1 embodiment of the present invention.

The system may take the input from a user via trackball, mouse, joystick or other interface device and display images accordingly. The program uses some of the function calls as they appear in the software libraries to accomplish this. A diagram of the main loop is shown in FIG. 21. The display_image function is responsible for updating the VRAM buffers and displaying the correct window within the VRAM. A diagram illustrating this function is shown in FIG. 22.

Embodiments of the invention do not use an operating system. There are two immediate benefits from this approach. Because the image data needs to travel from the SCSI PMC board to the video PMC board via the PCI bus, it is important that the bandwidth of the PCI bus be maximized at all times. This can be guaranteed only if there is no operating system (such as windows NT or Linux) running An operating system tends to cause an unpredictable amount of traffic on the PCI bus. The second benefit of not having an operating system is the drastically reduced boot time. Because the system is not loading an operating system, the reboot time may be reduced to approximately 3 seconds.

An embodiment of the invention is essentially a stand-alone unit, outputs video or still images, and can be readily integrated into most environments. Most VGA monitors accept progressive signals between 604×480 and 1280×1024 at 60 to 85 Hz. The system may run, for example, at 640×480 at 75 Hz, therefore it can be used in conjunction with a supercomputer or a regular office computer.

The invention enables the streaming of image data from the disk drive to the offscreen VRAM as the user roams through the onscreen VRAM. When the system issues a read command to the SCSI controller, the command is issued as non-blocking and therefore returns control back to the user while the image is being read from the disk in the background. This requires extensive low-level control of the registers on the SCSI controller.

A feature of the invention is that the performance of the system does not degrade as the image size increases. Prior art systems degrade drastically as the image size increases because they need to seek through most of the image to actually read the lines they require. In the invention images may be stored on the disk drive in a tiled and overlapping format to overcome this limitation. The image may be split into tiles with horizontal and/or vertical overlap. Each given display output is entirely within a single tile. When an image is read from the disk it is therefore only necessary to perform one seek followed by a read command. The amount of overlap of neighboring tiles can be adjusted so very large tiles only have minimal overlap, for example, 640 pixels overlap for a 640×480 display. The display output is guaranteed to be entirely within a single tile. When the image is read from the disk it is therefore guaranteed that only 1 seek followed by a read command will ever be required.

Speed is further enhanced through various means as follows. Predictive means are provided to preload tiles into the off screen VRAM buffer. Prediction can be based on simple velocity or more complex criteria. Adequate VRAM size (e.g., 32 megabytes) is provided to allow preloading of multiple predictive zones and then choosing one on the fly. When streaming image data through a 3D graphics engine the bandwidth of the image stream is usually reduced drastically. To bypass this limitation, the present invention essentially takes the pixels from the disk drive and passes them into the VRAM without any manipulations. It is due to the fact that no manipulations are being made to the data that the data can be burst into the VRAM without any bandwidth limitations. Also, the disk drive is low-level formatted to be half of the tile width, e.g., the tile width is set to 1280 and disk block size is set to 640. Whenever a 1280×800 tile is read from disk to VRAM it is then only necessary to seek to the correct block and then read 4800 (800 lines×2 blocks/line×3 colors) blocks. Preferably, image tiles are block aligned on the disk to optimize disk access.

In FIG. 7 the outline of an image is shown 710. Images that users may be interested in showing on a display include, for example, geographic, chemical compound, biologic compound, organism, anatomical, and graphical images. Image 710 is shown divided into horizontal segments 1-8. These segments are for illustrative purposes only as the image 710 is not actually segmented as shown. However, because of disk drive storage limitations, image 710 may be made up of two or more files. The width of each segment is selected based on the width of the display on which an image is intended to be displayed. For example, display 720, having height 730 and width 740, may have a 1280×720 display resolution. In such case each of segments 1-8 may be 640 pixels wide.

FIG. 8 illustrates three tiles, i.e., Tile 1-Tile 3, which were generated utilizing software of the invention from the image 710 illustrated in FIG. 7. More particularly, Tile 1 includes tile sections 1-4, Tile 2 includes tile sections 3-6, and Tile 3 includes tile sections 5-6. As illustrated in Detail 810, each tile section includes rows of blocks of pixel data (i.e., data describing each pixel). For example, Row 1 includes block 830 pixel data, Row 2 includes block 840 pixel data, Row 3 includes block 850 pixel data. Tile 1 and Tile 2 have two tile sections, i.e., tile sections 3 and 4, that are virtually identical. Similarly, Tile 2 and Tile 3 have two tile sections, i.e., tile sections 5 and 6, that are virtually identical. These overlapping portions of adjacent tiles, described in more detail herein below, guarantee that a display image will always be available from a single tile loaded in VRAM. It is notable that the differences between overlapping portions are virtually imperceptible to a user. That is, there may be slight deviations between overlapping portions, however, a user would not be able to readily discern any difference when switching between them on a display.

FIG. 9 illustrates how Tile 1-Tile 3 are stored on a disk drive. Generally, the pixel data is stored as blocks starting from the top-left corner to the bottom-right corner of Tile 1, from the top-left corner to the bottom-right corner of Tile 2, and from the top-left corner to the bottom-right corner of Tile 3. More particularly, the blocks in Tile 1, Row 1 ($(\mathbf{1,2,3,4})_{Row\ 1}$) are stored, then the blocks in Tile 1, Row 2 ($(\mathbf{1,2,3,4})_{Row\ 2}$) are stored, etc., continuing to Tile 1, Row h ($(\mathbf{1,2,3,4})_{Row\ h}$). Thereafter, the blocks in Tile 2, Row 1 ($(\mathbf{3,4,5,6})_{Row\ 1}$) are stored, then the blocks in Tile 2, Row 2 ($(\mathbf{3,4,5,6})_{Row\ 2}$) are stored, etc., continuing to Tile 2, Row h ($(\mathbf{3,4,5,6})_{Row\ h}$). Thereafter, the blocks in Tile 3, Row 1 ($(\mathbf{5,6,7,8})_{Row\ 1}$) are stored, then the blocks in Tile 3, Row 2 ($(\mathbf{5,6,7,8})_{Row\ 2}$) are stored, etc., ending in Tile 3, Row h ($(\mathbf{5,6,7,8})_{Row\ h}$). The data is stored on the disk drive as one contiguous string of data that are block aligned. Those skilled in the art will appreciate that this arrangement has significant advantages in system operation including improved data access rates.

Figure 10:
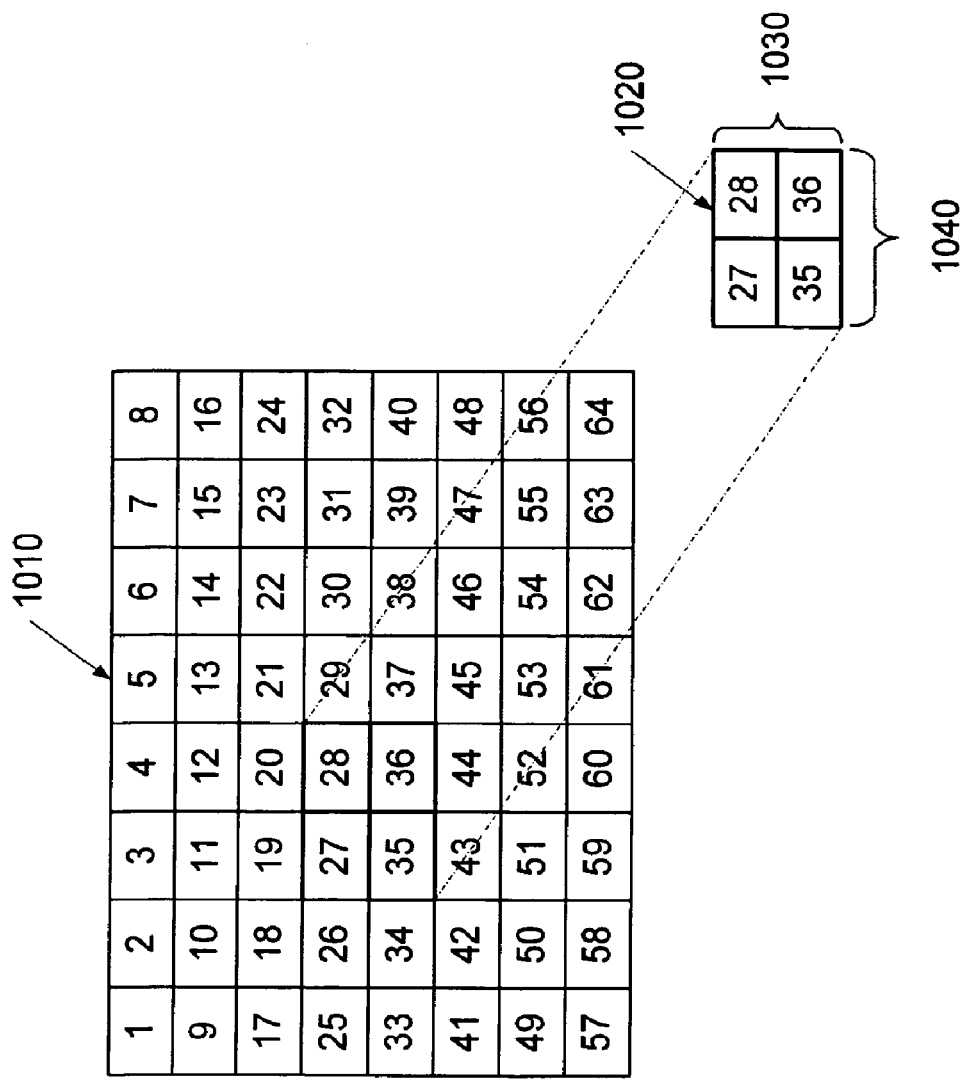
FIG. 10 illustrates an image that is to be transformed into tiles having horizontal and vertical overlap with adjacent tiles.

In FIG. 10 the outline of an image is shown 1010. Images that users may be interested in showing on a display include, for example, geographic, chemical compound, biologic compound, organism, anatomical, and graphical images. Image 1010 is shown divided into horizontal and vertical segments 1-64. These segments are for illustrative purposes only as the image 1010 is not actually segmented as shown. However, because of disk drive storage limitations, an original file may be made up of two or more files. The height and width of each segment is selected based on the height and width of the display on which an image is intended to be displayed. For example, display 1020, having height 1030 and width 1040, may have a 1280×720 display resolution. In such case each of segments 1-64 may be 640 pixels wide by 360 pixels high.

Figure 11:
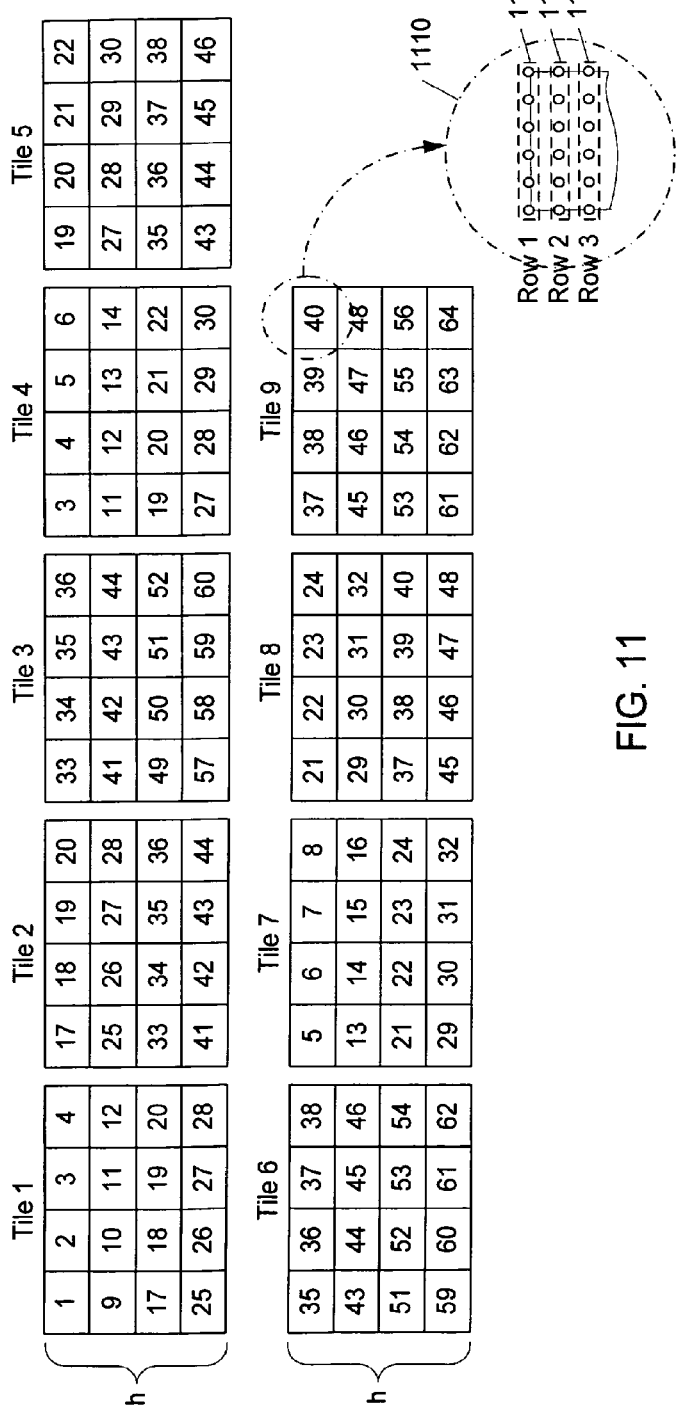
FIG. 11 illustrates tiles having horizontal and vertical overlap generated from the image illustrated in FIG. 10.

FIG. 11 illustrates nine (9) tiles, i.e., Tile 1-Tile 9, which were generated from the image 1010 illustrated in FIG. 10. More particularly, Tile 1 includes tile sections 1-4, 9-12, 17-20, and 25-28; Tile 2 includes tile sections 17-20, 25-28, 33-36, and 41-44; Tile 3 includes tile sections 33-36, 41-44, 49-52, and 57-60; Tile 4 includes tile sections 3-6, 11-14, 19-22, and 27-30; Tile 5 includes tile sections 19-22, 27-30, 35-38, and 43-46; Tile 6 includes tile sections 35-38, 43-46, 51-54, and 59-62; Tile 7 includes tile sections 5-8, 13-16, 21-24, 29-32; Tile 8 includes tile sections 21-24, 29-32, 37-40, and 45-48; and Tile 9 includes tile sections 37-40, 45-48, 53-56, and 61-64. As illustrated in Detail 1110, each tile section includes rows of blocks of pixel data. For example, Row 1 of tile section 40 includes block 1120 pixel data, Row 2 includes block 1130 pixel data, Row 3 includes block 1140 pixel data.

Each tile has horizontal and vertical overlap portions that overlap with adjacent tiles. For example, Tile 2 and Tile 5 have eight (8) tile sections, i.e., tile sections 19, 20, 27, 28, 35, 36, 43, and 44 that overlap and are virtually identical. Further, Tile 2 and Tile 4 have four (4) tile sections, i.e., tile sections 19, 20, 27, and 28 that overlap and are virtually identical. Furthermore, Tile 4 and Tile 5 have eight (8) tile sections, i.e., tile sections 19, 20, 21, 22, 27, 28, 29, and 30 that overlap and are virtually identical. These overlapping portions of adjacent tiles, described in more detail herein below, guarantee that a display image will always be available from a single tile loaded in VRAM. It is notable that the differences between overlapping portions are virtually imperceptible to a user. That is, there may be slight deviations between overlapping portions, however, a user would not be able to readily discern any difference when switching between them on a display.

Figure 12:
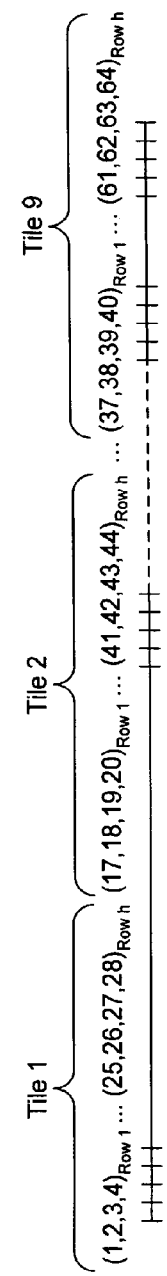
FIG. 12 illustrates a method of storing the tiles illustrated in FIG. 11.

In FIG. 12 illustrates how Tile 1-Tile 9 are stored on a disk drive. Generally, the pixel data is stored as blocks starting from the top-left corner to the bottom-right corner of Tile 1, from the top-left corner to the bottom-right corner of Tile 2, from the top-left corner to the bottom-right corner of Tile 3, etc. ending at the bottom-right corner of Tile 9. More particularly, the blocks in Tile 1, Row 1 ($(\mathbf{1,2,3,4})_{Row\ 1}$) are stored, then the blocks in Tile 1, Row 2 ($(\mathbf{1,2,3,4})_{Row\ 2}$) are stored, etc., continuing to Tile 1, Row h ($(\mathbf{25,26,27,28})_{Row\ h}$). Thereafter, the blocks in Tile 2, Row 1 ($(\mathbf{17,18,19,20})_{Row\ 1}$) are stored, then the blocks in Tile 2, Row 2 ($(\mathbf{17,18,19,20})_{Row\ 2}$) are stored, etc., continuing to Tile 2, Row h ($(\mathbf{41,42,43,44})_{Row\ h}$). This process continues for each tile until ending in Tile 9, Row h ($(\mathbf{61,62,63,64})_{Row\ h}$). The data is stored on the disk drive as one contiguous string of data that are block aligned. Those skilled in the art will appreciate that this arrangement has significant advantages in system operation including improved data access rates.

Figures 13, 14:
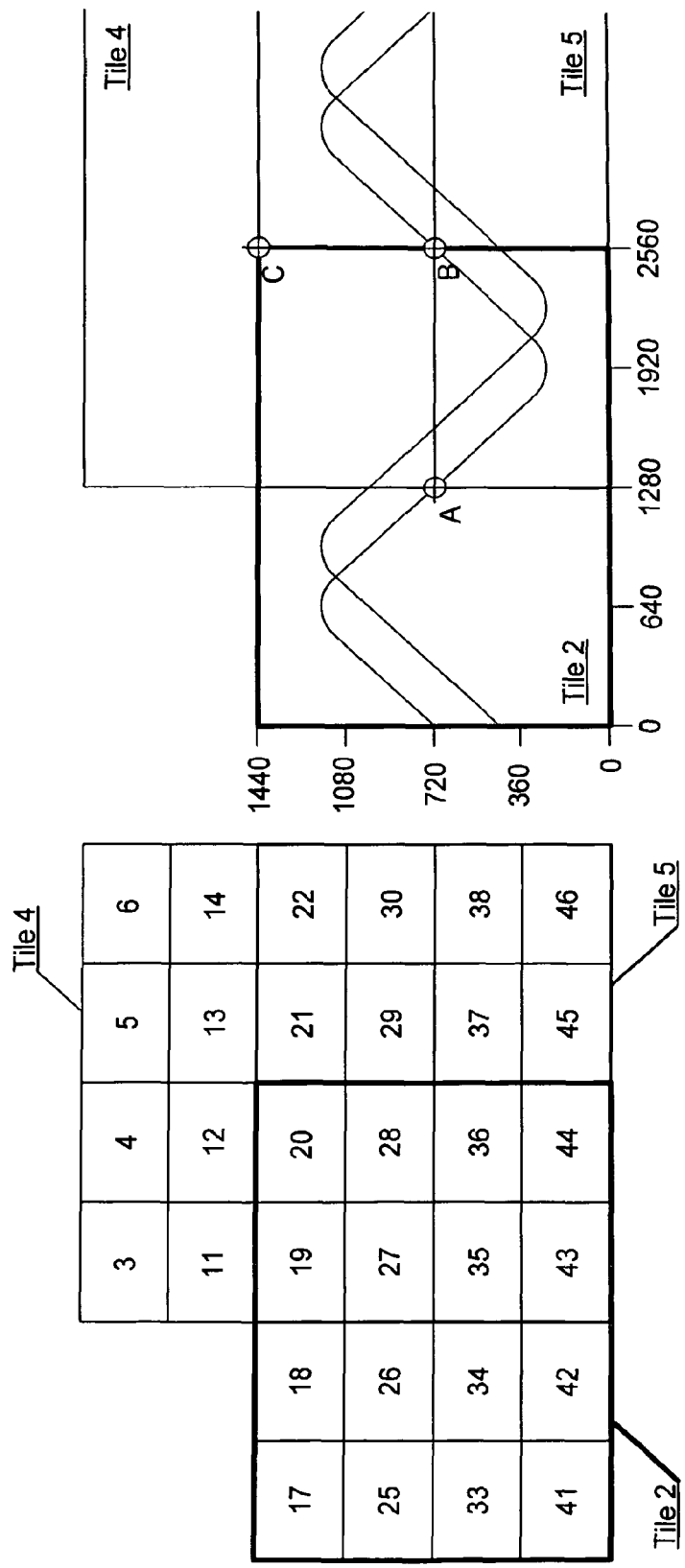
FIG. 13 shows Tiles 2, 4, and 5 of FIG. 11 superimposed in overlapping arrangement.
FIG. 14 shows Tiles 2, 4, and 5 superimposed in a manner similar to that shown in FIG. 13, however, including a double-sawtooth image.

Referring to FIG. 13, Tiles 2, 4, and 5, which are described above and illustrated in FIG. 11, are shown. The tiles are superimposed to further illustrate their relationship. That is, the tiles are superimposed so that the overlapping portions overlap. The outside border of each tile has a different lineweight to distinguish them.

Figure 15:
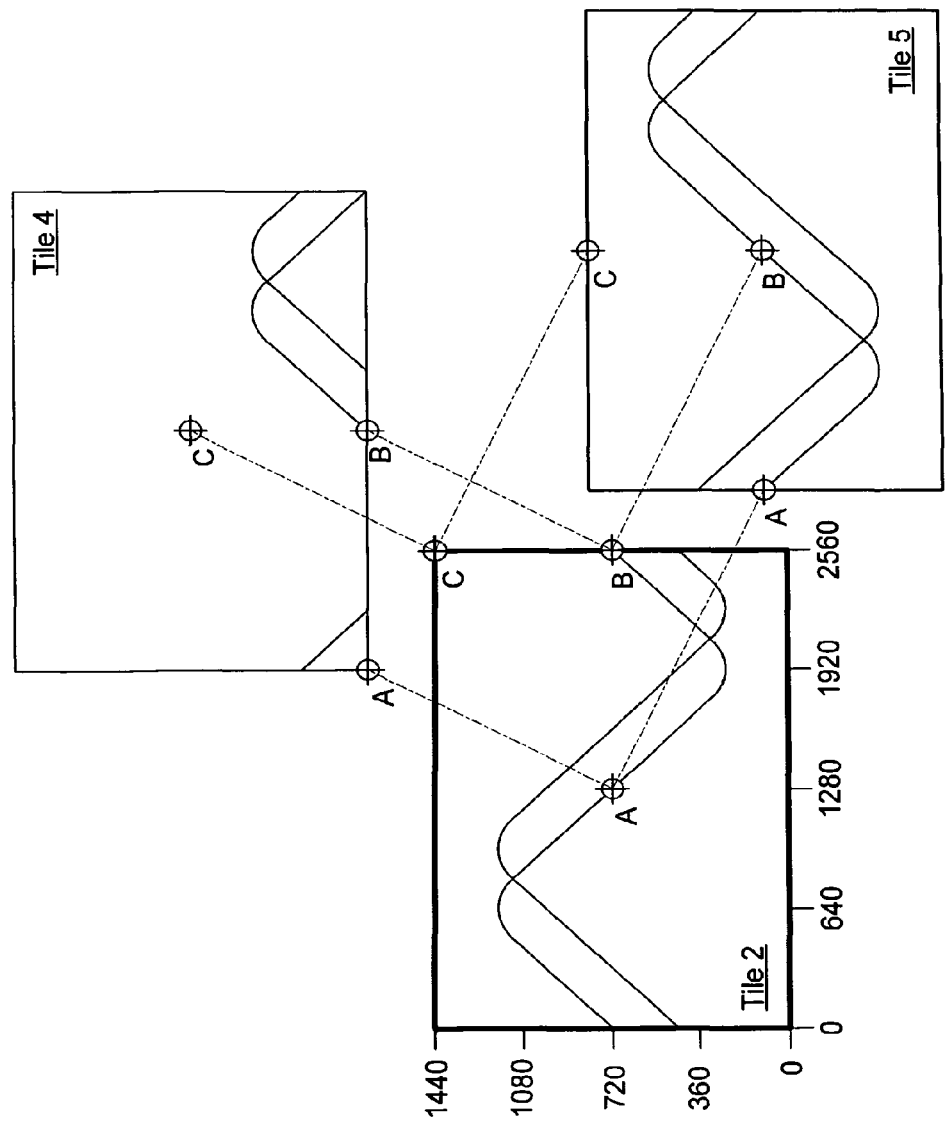
FIG. 15 shows Tiles 2, 4, and 5 from FIG. 14 separated to further illustrate their relationship.

Referring to FIG. 14, Tiles 2, 4, and 5 are superimposed as they are in FIG. 13, however, a double-sawtooth image is shown instead of the tile section borders and identifying numerals to facilitate a description of an embodiment of the present invention. Reference points "A," "B," and "C" are also included to further facilitate the description. Furthermore, for the description, each tile includes 2560×1440 pixels, therefore, each tile section includes 640×360 pixels. In FIG. 15, Tiles 2, 4, and 5 from FIG. 14 are shown separated to further illustrate their relationship. It is notable that although the tiles are shown superimposed to facilitate a better understanding of the invention, the tiles would not be overlapped during operation.

FIGS. 16-19 illustrate a method for showing images on a display when panning horizontally or vertically. Those skilled in the art will appreciate that the present invention provides for smooth and seamless navigation of large images. That is, as a user pans across an image from tile to tile, there are no perceptible, that is, no readily viewable skips or jumps in the image. Furthermore, although not specifically shown in the figures, the present invention provides for very quick jumping from image to image when, for example, an input device instructs the system to jump to an image (as opposed to panning to an image) that is not adjacent to an image being shown.

Figure 16:
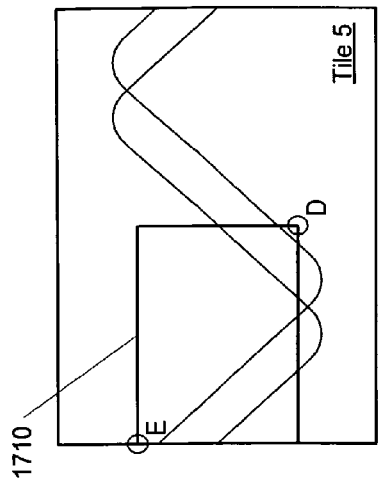
FIG. 16 shows Tile 2 of FIGS. 14 and 15, wherein a display image is shown to display the center-right-hand portion of the tile.

FIG. 16 illustrates Tile 2 as illustrated in FIGS. 14 and 15. To display a portion of the tile, the entire tile is stored in VRAM. A display image 1610 is illustrated in the center-right-hand portion of the tile. The display image 1610 is the portion of Tile 2 that was selected by a user for viewing on a display. In the example, the display image 1610 is 1280×720 pixels. The display image includes a portion of the double-sawtooth image. In order to ensure that the a complete image is shown on the display, the pixels in two diagonally opposing corners of the display image (e.g., the pixels in corners "E" and "D") are monitored.

Figure 17:
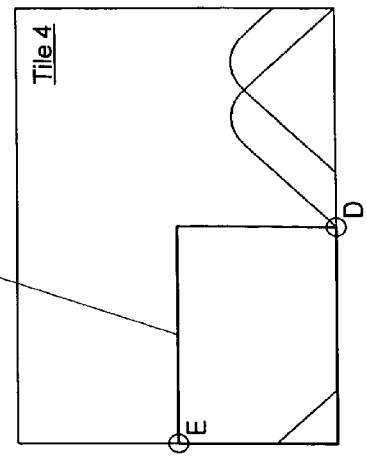
FIG. 17 shows Tile 5 of FIGS. 14 and 15, wherein a display image is shown to display the center-left-hand portion of the tile.

FIG. 17 illustrates Tile 5 as illustrated in FIGS. 14 and 15. A display image 1710 is illustrated in the center-left-hand portion of the tile. As the user pans Tile 2, successive display images are transmitted from VRAM to the user for viewing. Each display image is monitored (e.g., at the pixels in corners "E" and "D") to determine if it is within the tile. In FIG. 17 it was determined that the display image selected by the user (assuming the user was panning horizontally to the right in Tile 2 of FIG. 16) was not within Tile 2, but instead in the horizontally adjacent tile Tile 5. Therefore, Tile 5 is instantly loaded for viewing and display image 1710 is now viewed by the user. Because Tile 2 and Tile 5 are overlapped by at least an amount about equal to the width of the display, display image 1710 is virtually identical to display image 1610. Furthermore, because the present invention provides for transmitting images to the display rapidly and efficiently, the transition between the display image 1610 and the display image 1710 is imperceptible to the user.

Figure 18:
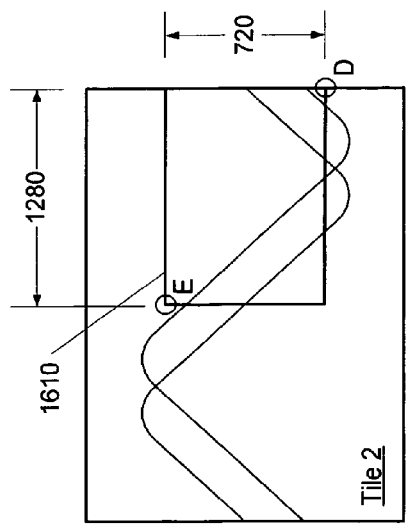
FIG. 18 shows Tile 5 of FIGS. 14 and 15, wherein a display image is shown to display the upper-left-hand portion of the tile.

FIG. 18 illustrates Tile 5 as illustrated in FIGS. 14 and 15. A display image 1810 is shown in the upper-left-hand portion of the tile. The display image 1810 is the portion of Tile 5 that was selected by the user for viewing on the display while panning vertically in the upward direction.

Figure 19:
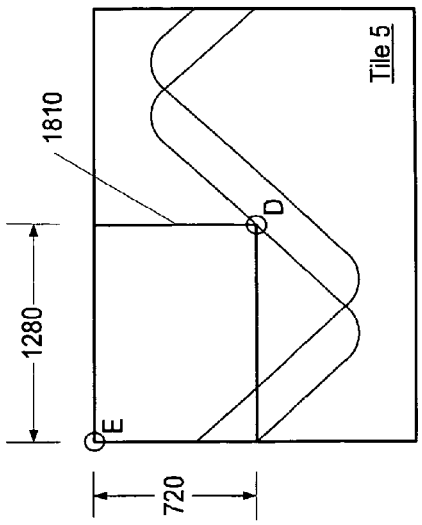
FIG. 19 shows Tile 4 of FIGS. 14 and 15, wherein a display tile is shown to display the lower-left-hand portion of the tile.

FIG. 19 illustrates Tile 4 as illustrated in FIGS. 14 and 15. A display image 1910 is shown in the lower-left-hand portion of the tile. As the user pans Tile 5 successive display images are transmitted from VRAM to the user for viewing. Each display image is monitored to determine if it is within the tile. In FIG. 19 it was determined that the display image selected by the user (assuming the user is panning vertically in the upward direction in Tile 5 of FIG. 18) was not within Tile 5, but instead in the vertically adjacent tile Tile 4. Therefore, Tile 4 is instantly loaded for viewing and display image 1910 is now viewed by the user. Because Tile 5 and Tile 4 are overlapped by at least an amount about equal to the height of the display, display image 1910 is virtually identical to display image 1810. Furthermore, because the present invention provides for transmitting images to the display rapidly and efficiently, the transition between display image 1810 and the display image 1910 is imperceptible to the user.

Figure 20:
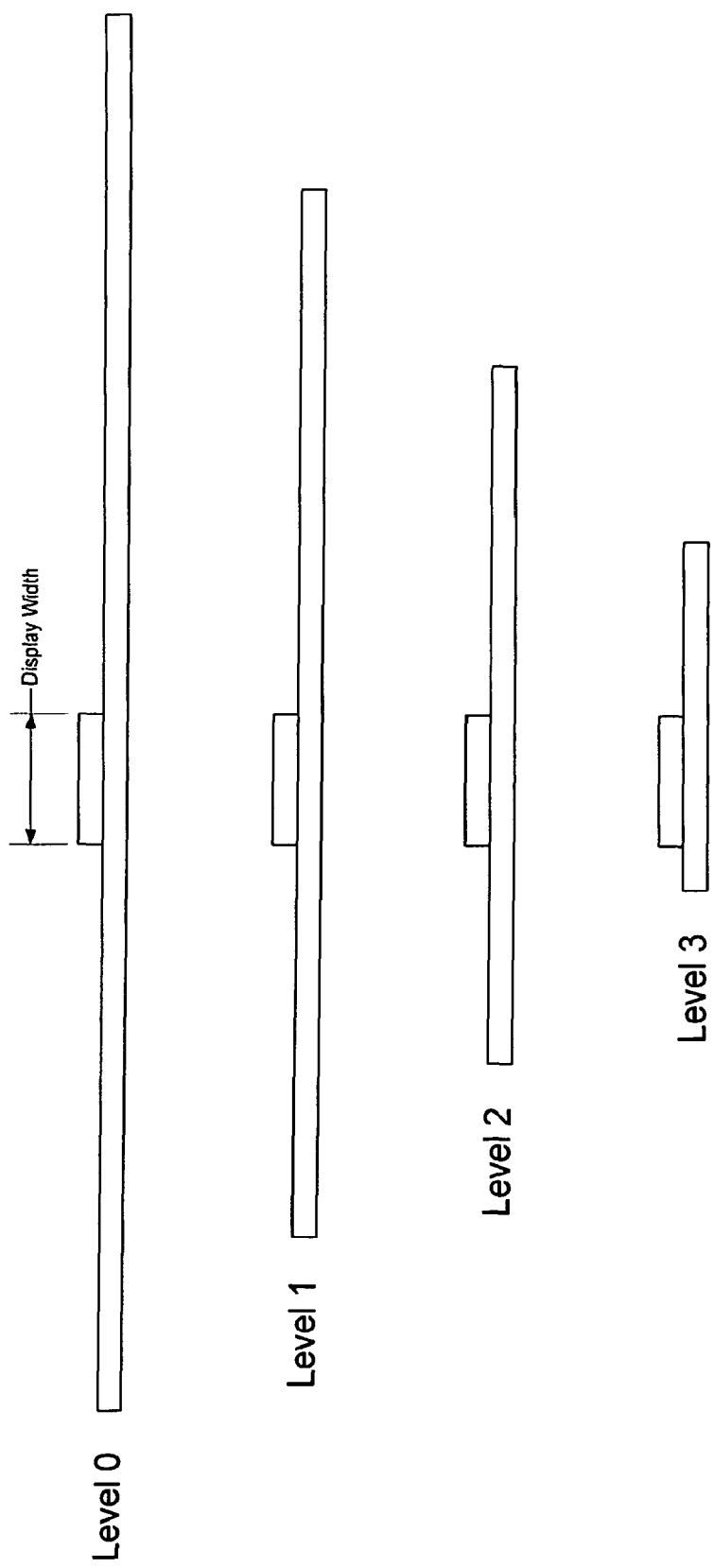
FIG. 20 illustrates a method of zooming pursuant to an embodiment of the present invention.

FIG. 20 illustrates a method of zooming pursuant to an embodiment of the present invention. A useful feature of the invention is the ability to zoom in and out of images very quickly. Instead of calculating the various zoom levels in real time from the massive original file, the zoom levels are calculated offline and stored on the disk drive. Prior art zooming methods zoom in and out in real time, thereby causing significant delays in showing an image.

An embodiment of the present invention for zooming includes the steps of storing an image on a storage device, receiving an instruction to generate and store multiple scaled levels of the image; scaling the image in accordance with the instruction; and storing the scaled levels on the storage device.

The embodiment may include, after the step of storing the scaled levels on the storage device, the step of receiving an instruction to transmit a particular scaled level of the image for viewing on a display. The receiving step may include receiving an instruction to generate and store multiple scaled levels of the image, wherein a scaling factor is selected from a group comprising a three decimal place number between 0 and 1, a five decimal place number between 0 and 1, and a ten decimal place number between 0 and 1. Furthermore, the image may be defined by tiles, each tile having two or more tile sections, the width of each tile section being such that the width of the display is a multiple of the width of each tile section, and the height of each tile section is greater than or about equal to the height of the display.

The invention provides for a software toolset as well as a custom hardware solution to display large images as ideally as possible. FIG. 22 illustrates the approach to such a system. The invention also provides a platform for future systems that one or ordinary skill in the art will anticipate to be lower cost and more portable.

Figure 23:
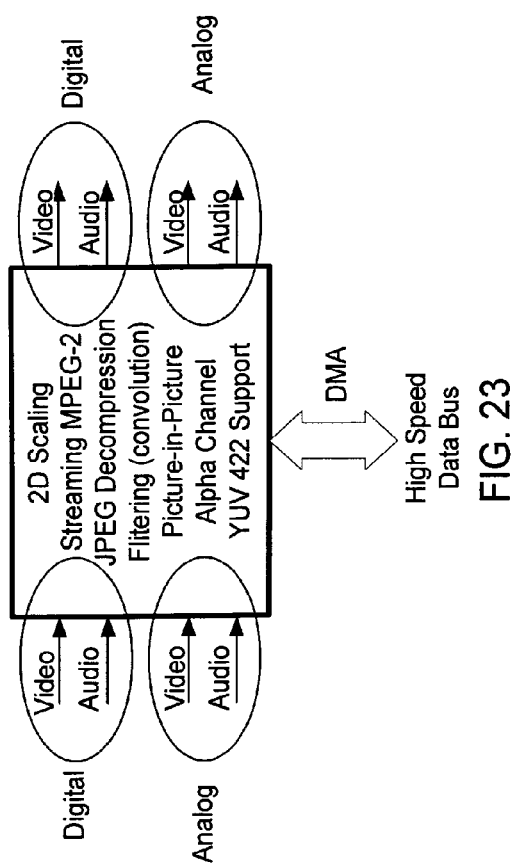
FIG. 23 shows the characteristics of a video chip that may be used in an embodiment of the present invention.

A video chip for a production-scale portable display system is on Peritek's latest VGA PMC board named the Eclipse3. The Eclipse3 is based on Peritek's Borealis3 graphics core. A significant difference between prior Peritek chips and the latest versions is the size of VRAM. The prior chip was limited to 8 megabytes of VRAM, while the new chip has 32 megabytes of VRAM. This allows embodiments of the present invention incorporating it to increase tile sizes and thereby increase the output resolution to at least 1024×768. It may be desirable to build a custom video chip. The essential features of such a chip are shown in FIG. 23.

By using simple JPEG decompression or some other image decompression, further embodiments of the invention can compress tiles individually and then decompress them in real time as they are being sent from the disk to the VRAM. This may be conveniently done in the FPGA. Additionally, provision can be made for decoding MPEG streams in real time. The inputs on the chip allow the system to be in-line with a second device feeding a monitor.

An embodiment of the invention is shown using a SCSI controller, but an IDE controller may suffice for performance. As prediction improves, the data rate from the disk drive can be reduced without affecting the overall performance of the system.

Figure 24:
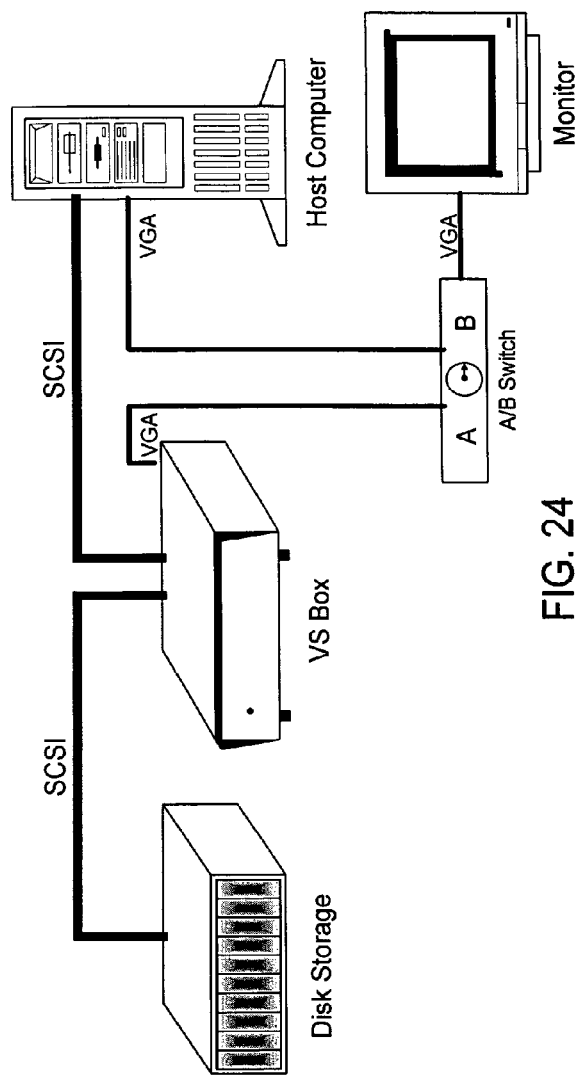
FIG. 24 is a hardware diagram of an embodiment of the present invention utilizing external storage.
Figure 25:
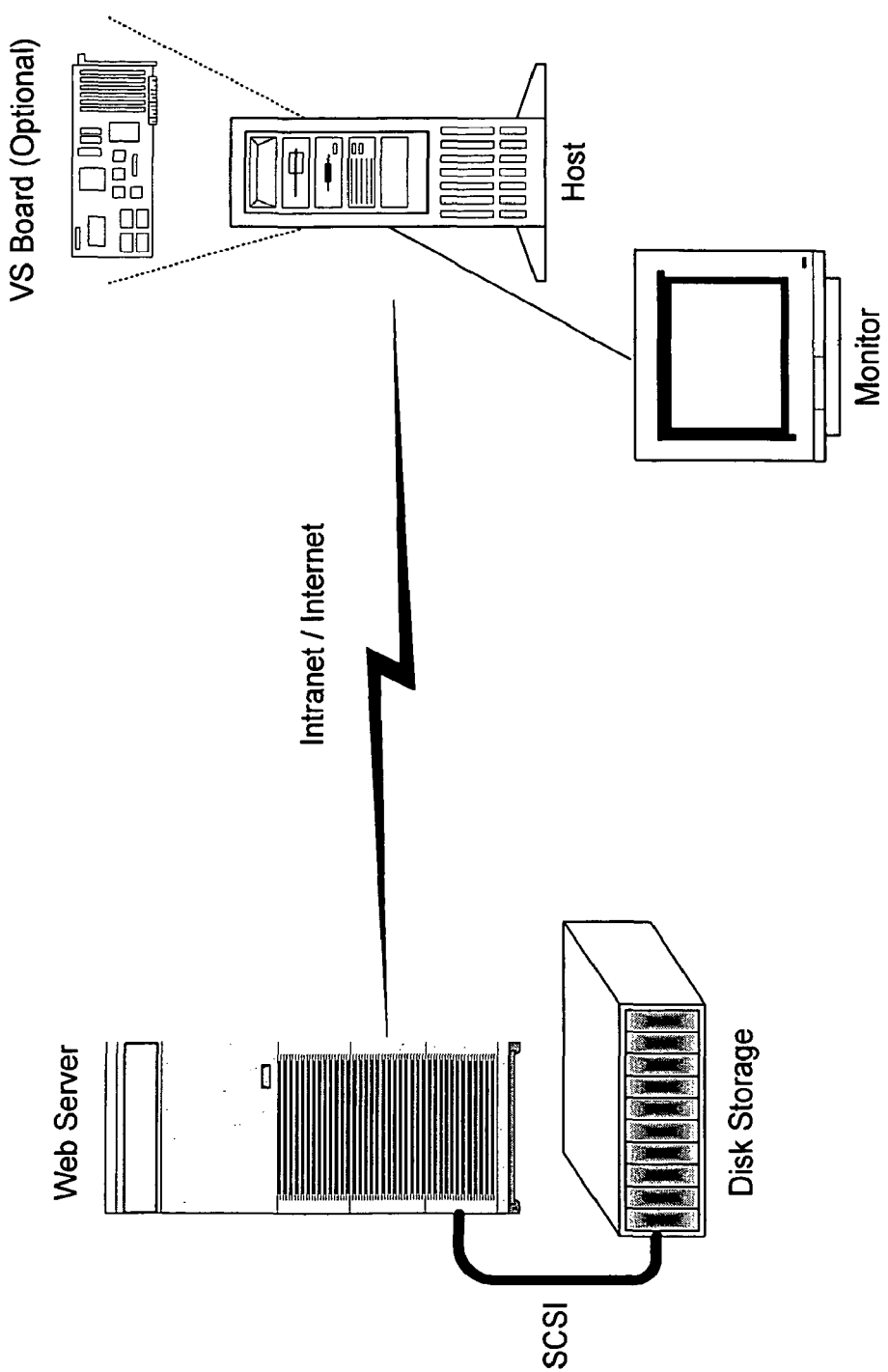
FIG. 25 is a hardware diagram of an embodiment of the present invention utilized in a networked environment, also using external storage.

FIGS. 24 and 25 illustrate additional embodiments of the invention, wherein a viewing system (VS) is connected to a host computer or a network. The viewing system may be a hardware system as described herein.

Referring to FIG. 24, a viewing system is connected to a host computer via a SCSI. A software application running on the host Windows or Unix machine may be used to enable the host to communicate to the viewing system via SCSI. A task of the software application is to translate files to and from the preferred file system on the disk drive(s). This will allow for third party applications to be written on the host, which use the viewing system API. Third party software companies could take advantage of the speed at which the system could serve "sub-images" from large images stored on disk drive(s) to host memory via SCSI. The system allows for images to be transferred to the viewing system and organized remotely on the host. If the viewing system is disconnected from the host it will function as an independent unit. The A/B switch toggles the monitor between displaying the local host computer or the viewing system. The system could also be used with an independent display device for both the host computer as well as the viewing system.

In FIG. 25, images are stored on a disk storage system attached to a server. A client workstation is connected to the server via a network (e.g., an intranet or the Internet). The server essentially serves up the compressed image tiles via the network based on the client's requests. The application running on the client is very similar to the application running on the viewing system. In order to improve performance, a viewing system is installed on the client. This allows the decompression to be done in hardware (without affecting the client's overall performance) as well as providing the ability to load the VRAM with a new tile while enabling smooth panning and zooming simultaneously. The bottleneck will be the network connection, which can be compensated for with increased image compression. This system will allow many users to access images from the same server.

Figure 26:
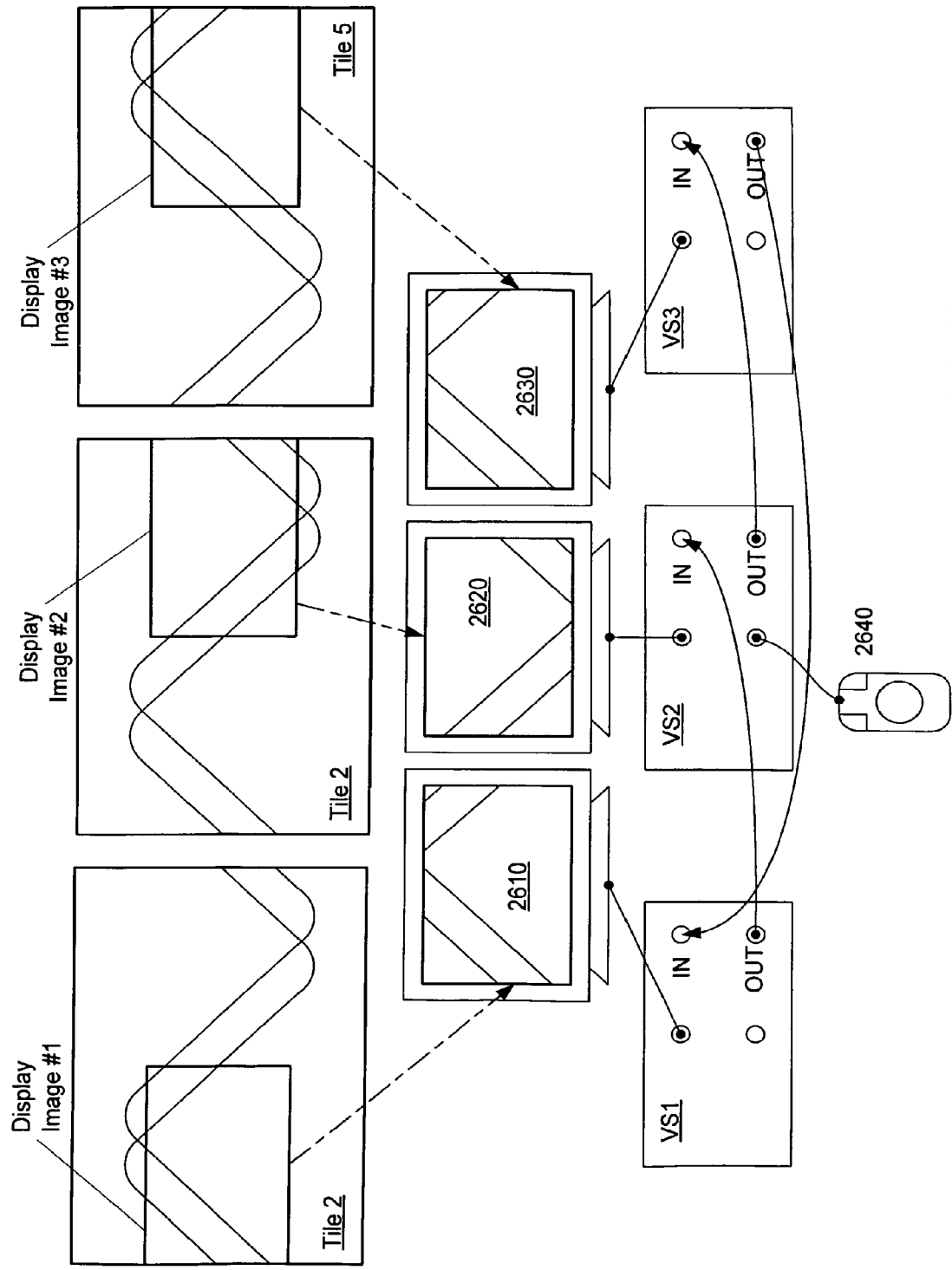
FIG. 26 is a hardware diagram of an embodiment of the present invention utilized in a cascade arrangement.

Referring to FIG. 26, a hardware diagram is shown of an embodiment of the present invention utilized in a cascade arrangement. The arrangement is a system wherein several viewing systems are slaved to each other via a high speed bus for displaying video or still images side-by-side. In the embodiment illustrated three viewing systems are cascaded VS1, VS2, and VS3. The viewing systems are interconnected as shown utilizing, for example, the "inter-system comms. for synchronization" "in" and "out" connectors of the hardware device illustrated in FIG. 5. Each viewing system is attached to a display 2610, 2620, and 2630, respectively. VS2 includes a mouse 2640 attached to a USB port. Basically, whenever the mouse 2640 is moved by a user, the display information (e.g., coordinate data) is transmitted from VS2 to VS3. VS3 goes to the appropriate display location and transmits display information to VS1 so that it can go to the appropriate display location. Once VS1 displays the appropriate display, it sends out display information to VS2 so that VS2 knows that all of the other viewing systems have gone to the new display location. Any number of viewing systems can be cascaded. Furthermore, multiple images from cascaded viewing system arrangements may be displayed on a single display device.

An example of coordinated display images from VS1, VS2, and VS3 is shown in FIG. 26 (i.e., Display Image #1, #2, and #3). It is notable that the display images do not have to be images that meet edge to edge to show a single image. That is, the images can be, for example, 3D images of a body taken from different angles that appear to rotate in a coordinated fashion as a user manipulates an interface device. Those skilled in the art will appreciate the numerous uses that such cascaded arrangements can provide.

An embodiment of the invention utilizes several cascade arrangements that are each in communication with the other. The multiple cascade arrangements may be useful for displaying large images at remote locations simultaneously. An example of the embodiment includes several cascade arrangements such as that illustrated in FIG. 26 that are each in communication with the other via a telephone connection. The same image is stored on each cascade arrangement. One of the cascade arrangements is configured to be master of the others. A signal providing coordinate data is sent from the master cascade arrangement to the slave cascade arrangements over the telephone connection when a user pans and/or zooms an image on the master cascade arrangement. Upon receipt of the coordinate data, the image on the displays of each of the slave cascade arrangements move in coordinated fashion with the movements of the image displayed on the master cascade arrangement. Image movement delays between the cascading arrangements are minimal since the only delay is the time it takes to transmit the coordinate data over the telephone lines. The embodiment is particularly useful for meetings wherein the participants are geographically remote from one another yet need to view the same large images in real time.

While the invention has been described with reference to specific embodiments, the description is illustrative only and is not to be construed as limiting the scope of the invention. Various modifications and changes may occur to those having ordinary skill in the art without departing from the spirit and scope of the invention as defined by the appended claims.

What is claimed is:

1. A method of configuring an image for data storage on a storage device in an overlapping-tiled format, comprising:
   formatting an image to comprise a plurality of image tiles, each image tile in the plurality of image tiles having at least a portion that is substantially identical to at least a portion of an adjacent image tile in the plurality of image tiles; and
   converting data of the image from data in a first color space into data in a second color space so as to reduce a size of the data of the image; and
   storing the image data in the second color space.

2. The method according to claim 1, wherein formatting comprises selecting a size of the portion of each image tile to be equal to or greater than a display size.

3. The method according to claim 1, wherein formatting comprises selecting a size of the portion such that each image tile overlaps an adjacent image tile by 50%.

4. The method according to claim 1, further comprising configuring each image tile for storage as a separate block of data, wherein a size of each image tile is an integer multiple of a size of a block of data.

5. The method according to claim 1, further comprising configuring data of each image tile for data storage as a contiguous string of data that is block aligned.

6. The method according to claim 5, wherein configuring data of each image for data storage comprises configuring each row of pixels in each image tile sequentially for data storage.

7. The method according to claim 1, wherein a size of the data of the image in the second color space is smaller than a size of the data of the image in the first color space.

8. The method according to claim 1, wherein converting data of the image from data in the first color space into data in the second color space comprises converting data of each image tile in the plurality of tiles from data in the first color space into data in the second color space.

9. The method according to claim 1, wherein converting data of the image from data in the first color space into data in the second color space comprises converting the data of the image from data in a RGB color space into data in a YUV 4:2:2 color space.

10. The method according to claim 9, wherein the data of the image in the RGB space comprises 24 bit-pixels and the data of the image in the YUV 4:2:2 color space comprises pixels having, on an average, 16 bits per pixel.

11. The method according to claim 1, further comprising displaying the image data in the second color space on a display device.

12. The method according to claim 11, wherein the displaying comprises displaying the image data in a RGB color space on the display device

* * * * *